(12) United States Patent
Bill

(10) Patent No.: US 7,831,384 B2
(45) Date of Patent: Nov. 9, 2010

(54) DETERMINING A ROUTE TO DESTINATION BASED ON PARTIALLY COMPLETED ROUTE

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 1235 days.

(21) Appl. No.: 11/321,648

(22) Filed: Dec. 30, 2005

(65) Prior Publication Data

US 2006/0173841 A1  Aug. 3, 2006

Related U.S. Application Data

(63) Continuation-in-part of application No. 11/019,526, filed on Dec. 23, 2004, now abandoned.

(60) Provisional application No. 60/622,797, filed on Oct. 29, 2004.

(51) Int. Cl.
   *G06F 17/30* (2006.01)
(52) U.S. Cl. .................. 701/209; 701/208; 701/210; 340/995.22; 340/995.14; 340/995.19; 340/995.18
(58) Field of Classification Search ................. 701/117, 701/200, 201, 208, 209, 210, 211; 707/6; 340/995.22, 995.14, 995.19, 995.18
See application file for complete search history.

(56) References Cited

U.S. PATENT DOCUMENTS

| | | | |
|---|---|---|---|
| 5,948,040 A | 9/1999 | DeLorme et al. | |
| 6,049,753 A | 4/2000 | Nimura | |
| 6,529,819 B2 | 3/2003 | Baur et al. | |
| 6,549,768 B1 | 4/2003 | Fraccaroli | |
| 6,577,937 B1 | 6/2003 | Shuman et al. | |
| 6,622,087 B2 | 9/2003 | Anderson | |
| 6,812,888 B2 | 11/2004 | Drury et al. | |
| 6,941,222 B2 * | 9/2005 | Yano et al. | 701/209 |
| 6,978,246 B1 | 12/2005 | Ruvolo et al. | |
| 7,050,903 B1 | 5/2006 | Shutter et al. | |
| 7,096,115 B1 | 8/2006 | Groth et al. | |
| 7,130,743 B2 * | 10/2006 | Kudo et al. | 701/209 |
| 7,139,659 B2 | 11/2006 | Mbekeani et al. | |

(Continued)

FOREIGN PATENT DOCUMENTS

WO  WO 99/09374  2/1999

(Continued)

OTHER PUBLICATIONS

Final Office Action for U.S. Appl. No. 11/413,109, mailed Dec. 11, 2009.

*Primary Examiner*—Thomas G Black
*Assistant Examiner*—Wae Louie
(74) *Attorney, Agent, or Firm*—Finnegan, Henderson, Farabow, Garrett & Dunner, LLP

(57) ABSTRACT

Techniques are provided for predicting a destination for a ground-based vehicle. Travel patterns are accessed and a series of locations of a ground-based vehicle are received. At least some of the received locations are related to at least one accessed travel pattern, and a destination of the ground-based vehicle is predicted based on relating the received locations with the travel patterns. An existence of an event may be predicted using the predicted destinations of a ground-based vehicle.

57 Claims, 18 Drawing Sheets

U.S. PATENT DOCUMENTS

| | | | |
|---|---|---|---|
| 7,176,813 B2 * | 2/2007 | Kawamata et al. | 340/995.13 |
| 7,194,419 B2 | 3/2007 | Robertson et al. | |
| 7,289,039 B2 * | 10/2007 | Kato et al. | 340/905 |
| 7,439,878 B2 * | 10/2008 | Kato et al. | 340/988 |
| 2003/0069683 A1 | 4/2003 | Lapidot | |
| 2004/0102896 A1 | 5/2004 | Thayer | |
| 2004/0104842 A1 | 6/2004 | Drury et al. | |
| 2004/0128066 A1 * | 7/2004 | Kudo et al. | 701/204 |
| 2005/0065711 A1 | 3/2005 | Dahlgren et al. | |
| 2005/0076078 A1 | 4/2005 | Salton | |
| 2005/0096842 A1 | 5/2005 | Tashiro | |
| 2005/0114014 A1 | 5/2005 | Isaac | |
| 2005/0143903 A1 | 6/2005 | Park et al. | |
| 2005/0165762 A1 | 7/2005 | Bishop | |
| 2006/0058950 A1 * | 3/2006 | Kato et al. | 701/208 |
| 2006/0064237 A1 | 3/2006 | Mbekeani et al. | |
| 2006/0158330 A1 | 7/2006 | Gueziec | |
| 2006/0167592 A1 * | 7/2006 | Kudo et al. | 701/1 |
| 2006/0173841 A1 * | 8/2006 | Bill | 707/6 |
| 2006/0178807 A1 * | 8/2006 | Kato et al. | 701/117 |
| 2007/0010942 A1 | 1/2007 | Bill | |

FOREIGN PATENT DOCUMENTS

| | | |
|---|---|---|
| WO | WO 00/74019 | 12/2000 |

* cited by examiner

300

| ORIGIN (310) | DESTINATION (320) | TIME ASSOCIATED WITH DESTINATION QUERY (330) | |
|---|---|---|---|
| 1234 Baker St. | ABC Stadium | 3:00 p.m. Today | ←340A |
| 9874 Juniper Dr. | 8674 Maple Ave. | 3:05 p.m. Today | ←340B |
| 365 Langley Ct. | 4356 Reston Pl. | 3:17 p.m. Today | ←340C |
| | ABC Stadium | 3:21 p.m. Today | ←340D |
| | ABC Stadium | 3:23 p.m. Today | ←340E |
| 56654 Northview Dr. | 809 Greeley Blvd. | 3:30 p.m. Today | ←340F |
| 2313 West Dr. | ABC Stadium | 3:38 p.m. Today | ←340G |
| 6778 Baker St. | XYZ Mall | 3:42 p.m. Today | ←340H |
| | City Zoo | 3:43 p.m. Today | ←340I |
| 1211 West Dr. | ABC Stadium | 3:44 p.m. Today | ←340J |
| 332 East St. | 784 Oak Ave. | 3:46 p.m. Today | ←340K |
| | ABC Stadium | 3:47 p.m. Today | ←340L |

| TRAVEL PATTERN IDENTIFIER | TRAVEL PATTERN NAME | ORIGIN | DESTINATION | ROUTE LINKS (set) | ALTERNATIVE ROUTE LINKS (set) | FREQUENCY | TIME/DAY CONSTRAINTS | SOURCE | LAST OCCURRENCE |
|---|---|---|---|---|---|---|---|---|---|
| TP-1004 | To School | Home | Westbriar Elementary School | RL-21232 | | HIGH: EACH WEEKDAY | WEEKDAY MORNING | Vehicle: Van | 3/5/2005 |
| TP-1005 | To Work | Home | XYZ Company Springfield, MA | RL-54433 | RL-34504 | HIGH: EACH WEEKDAY | WEEKDAY MORNING | Vehicle: Sedan | 3/5/2005 |
| TP-1006 | From Work | XYZ Company Springfield, MA | Home | RL-483839 | RL-493933 | HIGH: EACH WEEKDAY | WEEKDAY EVENING | Vehicle: Sedan | 3/5/2005 |
| TP-1007 | ABC Arena from Work | Work | ABC Arena | RL-03392 | RL-49394 | INFREQUENT | EVENING | User: Kurt | 1/5/2005 |
| TP-1008 | ABC Arena from Home | Home | ABC Arena | RL-0454 | RL-78494 | INFREQUENT | EVENING | User: Kurt | 6/5/2004 |
| TP-1009 | Aunt Sally's House | Home | 1234 Main St. South Haven, SC | RL-94939 | RL-04949 | LOW: TWICE PER YEAR | MORNING DEPARTURE | User: Jane | 11/23/2004 |

1350

| STOP IDENTIFIER | STOP NAME | NODE IDENTIFIER | CATEGORY OF STOP | TRAVEL PATTERN IDENTIFIER | CONDITION | TIME/DAY CONSTRAINTS | LAST OCCURRENCE |
|---|---|---|---|---|---|---|---|
| ST-4569 | ABC Grocery Store | N949443 | Grocery Store | TP-1006 | REMINDER: THURSDAY EVENING | | 3/1/2005 |
| ST-4969 | Organic Grocery | N95949 | Grocery Store | TP-1006 | INFREQUENT | | 2/28/2005 |
| ST-4978 | ZYX Gas | N984849 | Gas | TP-1006 | Detected Low Fuel | | |
| ST-5678 | BCD Travel Plaza | N34533 | Turnpike Service Area | TP-1009 | PROXIMITY TO N34533 | | 11/23/2004 |

US 7,831,384 B2

DETERMINING A ROUTE TO DESTINATION BASED ON PARTIALLY COMPLETED ROUTE

CROSS REFERENCE TO RELATED APPLICATIONS

This application is a continuation-in-part of U.S. application Ser. No. 11/019,526, filed Dec. 23, 2004 now abandoned and titled PREDICTING AN EVENT AT A LOCATION that claims the benefit of U.S. Provisional Application No. 60/622,797, filed Oct. 29, 2004, and titled DYNAMICALLY PREDICTING AN EVENT AT A LOCATION, both of which are incorporated by reference in its entirety.

TECHNICAL FIELD

This description relates to using a computer system to analyze mapping queries and to using an electronic system to determine a route to a destination based on a partially completed route and to suggest stops along a route.

BACKGROUND

A traveler may submit a mapping query to request mapping information, such as a location map for a location, a suggested route between an origin location, and a destination location or driving directions to a destination location from an origin location. To generate a route or driving directions for a route, mapping computer systems and programs are generally configured to search for one or more optimal paths from the origin to the destination. Moreover, mapping computer systems and programs typically optimize such paths based on criteria, such as distance, road type, travel time, traffic and user travel preferences.

In-vehicle navigation systems also generate routes to a destination or driving directions for a route. Routes are typically generated using a destination entered by a user and a location of a vehicle. Navigation and driving directions to a destination may be provided by the in-vehicle navigation system. The in-vehicle navigation system may provide a route or driving directions to a point of interest if the user of the vehicle enters the point of interest as a destination address.

SUMMARY

In one general sense, a destination for a ground-based vehicle may be predicted by accessing travel patterns, receiving a series of locations of a ground-based vehicle, relating at least some of the received locations to at least one accessed travel pattern, and predicting a destination of the ground-based vehicle based on relating the received locations to the travel patterns.

Implementations may include one or more of the following features. For example, an indication of the predicted destination or a user confirmation for the indication of the predicted destination may be displayed. A user may be notified of information related to the predicted destination. Notifying the user may include notifying a user that an event is predicted at the destination. A user may be interrogated for more information related to the event so as to distinguish between multiple events occurring within a proximity threshold. The user may be notified about a point of interest along the route to the destination. The point of interest may include an ATM, a gas station, a restaurant, or a shopping venue related to the destination. A user may be notified of information related to a route to the predicted destination.

A route to the predicted destination may be determined and driving directions may be provided to the destination. The travel patterns may include historical route information. The travel pattern may include real-time route information indicative of other vehicles in transit as the travel patterns are accessed. The prior routes traveled may include routes traveled by the ground-based vehicle. The travel patterns may include prior routes traveled by a portable device currently associated with the ground-based vehicle, routes traveled during a particular time of day, routes traveled during a particular day of week, a frequency of traveling a route, or a travel pattern of a person associated with the vehicle. Information about a network of roads may be accessed. The information about the network of roads may include a routing graph representing a network of roads and include two or more nodes and one or more links, each link representing a road and each node representing an intersection that includes at least one road.

A location in the series may be determined from a global positioning system associated with the ground-based vehicle, including a global positioning system that is external to the vehicle. A location in the series may be received from a global positioning receiver that is internal to the vehicle or determined from a mobile device associated with the ground-based vehicle. The mobile device may include a mobile telephone. A location in the series may be determined by triangulating a position of the ground-based vehicle. Receiving the series of locations may include receiving a single location and a direction of travel. Receiving a series of locations may include receiving a single location and time of day.

An interest by others in a venue may be detected and used to predict the destination. Detecting the interest by others in the venue may include receiving a route request by the others, receiving location and direction information for users travelling via a different route, receiving an indication that the others are travelling via a same route, or determining users with a similar profile have referenced event information published on a communications network. A navigation system may determine that the users with the similar profile are travelling to the venue.

In another general sense, existence of an event may be predicted by receiving a request for a route to a destination, accessing a time constraint associated with the request, and relating the route to other routes based on the time constraint and the destination. Based on relating the route to the other routes, the existence of an event at the destination may be predicted.

Implementations may include one or more of the following features. The route may include a route derived from an in-vehicle navigation system. The destination may include a location predicted based on a partially completed route traveled by a ground-based vehicle. The route may include a route determined in response to a mapping query. A user may be notified of the event. Notifying the user may include interrogating the user for more information related to the event so as to distinguish between multiple events occurring within a proximity threshold. Notifying the user may include providing information related to anticipated traffic conditions associated with the event. Accessing a time constraint associated with the request may include accessing a time constraint associated with submission of the event or accessing a time constraint associated with a travel time specified by the request.

Providing information related to the anticipated traffic conditions associated with the event may include providing a suggested alternative route to the location of the event. Notifying the user may include providing information related to anticipated parking conditions for the event. Notifying the user may include providing event information that is received from a source other than a mapping system used to detect the event.

In yet another general sense, a destination for a ground-based vehicle may be predicted by accessing travel patterns, receiving a series of locations of a ground-based vehicle, and determining a degree of travel for the ground-based vehicle. The degree of travel is indicative of an extent to which a destination is identified as being local to a user. At least some of the received locations are related to at least one accessed travel pattern. Results are predicted based on relating the received locations to the travel patterns and the destination is identified from one of the results that is supported by the degree of travel.

Implementations may include one or more of the following features. Determining the degree of travel may include determining that the user is travelling beyond a local environment. Identifying the destination may include determining that one of the results represents a point of interest for a user travelling beyond the local environment.

Identifying the destination may include determining that other users are travelling beyond their local environment are travelling to the destination. Determining the degree of travel may include determining that the user is travelling in a local environment. Identifying the destination may include determining that one of the results represents a point of interest for a user travelling in the local environment.

In still another implementation, an event for a ground-based vehicle is predicted by accessing travel patterns, receiving a series of locations of a ground-based vehicle, and determining a degree of travel for the ground-based vehicle. The degree of travel is indicative of an extent to which a destination is identified as being local to a user. At least some of the received locations are related to at least one accessed travel pattern. Results may be predicted based on relating the received locations to the travel patterns, and an event may be identified from one of the results that is supported by the degree of travel. Determining the degree of travel may include determining that the user is travelling beyond a local environment. Identifying the destination may include determining that one of the results represents a point of interest for a user travelling beyond the local environment. Identifying the destination may include determining that other users are travelling beyond their local environment are travelling to the destination.

Determining the degree of travel may include determining that the user is travelling in a local environment. Identifying the destination may include determining that one of the results represents a point of interest for a user travelling in the local environment.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 3 is a diagram of example mapping queries that may be used to predict an event.

FIG. 13 shows sample data that may be found in the data structures.

DETAILED DESCRIPTION

Techniques are provided for predicting information related to mapping queries and/or a route traveled by a ground-based vehicle. One technique involves analyzing mapping queries that are submitted or executed within a limited time period or window and are related to a destination relative to which an event is detected or predicted. Multiple mapping queries may occur for a common destination, or nearby destinations, during a time threshold. The mapping queries that are related to the destination may be identified and used to detect or predict that an event is occurring or that an event will occur at the destination.

Another technique involves predicting the destination of a vehicle based on a partially completed route. The locations of a vehicle may be monitored and a predicted destination of a vehicle may be generated based on accessed travel patterns. While a vehicle is traveling, locations of the vehicle may be compared to travel patterns to generate a predicted destination of the vehicle. Other factors, such as the time of day the vehicle is traveling, the day of the week the vehicle is traveling, and the frequency with which the vehicle travels a particular route, may be considered in predicting the destination. After a predicted destination has been generated, stops associated with the predicted destination may be presented to a user.

When a predicted destination of a vehicle has been generated based on a partially completed route, the predicted destination may be used with other predicted destinations and/or mapping queries to predict an event. By enabling the prediction of an event and/or a popular location destination (which may be referred to as a hotspot) based on destination searches and/or predicted destinations received during a time window, relevant services may be offered based on the emerging event scenario. Such services may include projecting traffic data in advance of actual traffic congestion, projecting crowd densities at specific locations, and making suggested connections to others separately or in combination with another social networking connection structure. Other types of services based on the provision of timely intelligence related to dynamic events, hotspots, or a predicted destination also may be provided.

Figure 1:
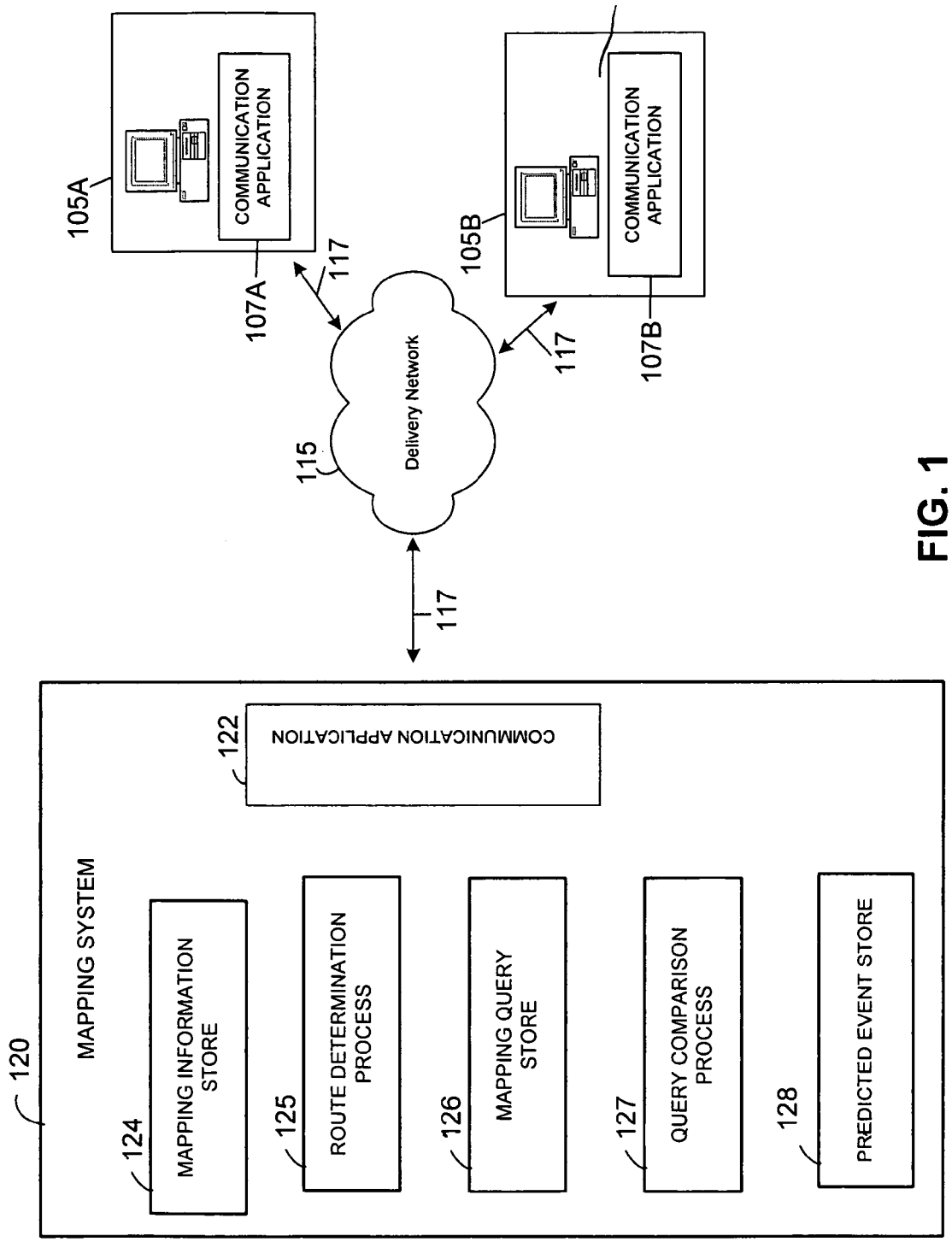
FIGS. 1 and 7 are block diagrams of communications systems capable of predicting an event based on mapping queries.

In addition, when the destination of a vehicle has been predicted and confirmed by the user, the route to the destination may be determined and possible stops along the route may be suggested. An in-vehicle navigation system may dynamically suggest points of interest, such as a gas station, an ATM, and/or a restaurant, as the user travels along the route. The in-vehicle navigation system may provide routing information to the suggested stops, and may determine what stops to suggest based on many factors, such as time of day and preferences of the user. Stops also may be suggested in advance of travel by a mapping system. Referring to FIG. 1, a communications system 100 is capable of delivering and exchanging data between client systems 105A and 105B and a mapping system 120 through a delivery network 115. The communications system 100 is able to provide each of the client systems 105A and 105B with mapping results and related event information in response to map queries sent by the client systems 105A and 105B.

More particularly, each client system 105A, 105B may be a general-purpose computer (e.g., a personal computer, a desktop computer, or a laptop computer) capable of responding to and executing instructions in a defined manner. Other examples of the client system 105A, 105B include a special-purpose computer, a workstation, a server, a device, a component, other physical or virtual equipment or some combination thereof capable of responding to and executing instructions. The client system 105A, 105B also may be, for example, a personal digital assistant (PDA), a communications device, such as a mobile telephone, or a mobile device that is a combination of a PDA and a communications device.

Each client system 105A, 105B includes a communication application 107A or 107B, respectively, and is configured to use the communication application 107A, 107B to establish a communication session with the mapping system 120 over the delivery network 115. The communication application 107A, 107B may be, for example, a browser application or another type of communication application that is capable of accessing the mapping system 120. In another example, the communication application 107A, 107B may be a client-side mapping application configured to communicate only with the mapping system 120.

The client system 105A, 105B is configured to send to the mapping system 120 a request for a map, a suggested route from an origin location to a destination location, or driving directions for a route between an origin location and a destination location. The client system 105A, 105B also is configured to receive from the mapping system 120 a map, information about a suggested route, and/or driving directions for a route. The client system 105A, 105B also is configured to present the received map, information about a suggested route, and driving directions for a route.

The delivery network 115 provides a direct or indirect communication link between each of the client systems 105A, 105B and the mapping system 120, irrespective of physical separation. Examples of a delivery network 115 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 115 also includes communication pathways 117 that enable the client system 105A, 105B and the mapping system 120 to communicate with the one or more delivery networks 115. Each of the communication pathways 117 may include, for example, a wired, wireless, virtual, cable or satellite communications pathway.

As with the client system 105A, 105B, the mapping system 120 may be implemented using, for example, a general-purpose computer capable of responding to and executing instructions in a defined manner, a special-purpose computer, a workstation, a server, a device, a component, or other equipment or some combination thereof capable of responding to and executing instructions. The mapping system 120 may receive instructions from, for example, a software application, a program, a piece of code, a device, a computer, a computer system, or a combination thereof, which independently or collectively direct operations, as described herein. The mapping system 120 includes a communications application 122 that is configured to enable the mapping system 120 to communicate with the client systems 105A, 105B through the delivery network 115.

The mapping system 120 may be a host system, such as, an Internet service provider that provides a mapping service to subscribers. The mapping system 120 may be a system that hosts a web site that provides mapping servers to the general public. The mapping system 120 may be an on-board navigation system that is located in a vehicle and configured to provide driving directions based on the vehicle's current location. In some implementations, an on-board navigation system also may be capable of communicating with another system, such as, for example, communicating with a host system to receive updated navigation data for use in determining a route or real-time routing information (such as information about traffic congestion).

In general, the mapping system 120 is configured to receive mapping queries from the client systems 105A, 105B and to predict an event by analyzing mapping queries that are received during a period of time and are related to a particular destination.

The mapping system 120 includes a mapping information store 124 for image and routing data used for maps, route determinations, and driving directions. The mapping information store 124 may include geographic images, such as bit-mapped maps for geographic areas (e.g., states, cities, and streets). The mapping information store 124 also may include information related to roads, intersection of roads, and places of interest within the geographic region. For example, the mapping information store may include a information related to a directed graph that represents a network of roads. Links in the directed graph may represent a road, and nodes in the directed graph may represent an intersection of two or more roads or a terminal part of a road, such as a dead-end.

The mapping system 120 also includes code segments 125 configured to determine a route between an origin location and destination location identified by a user. The origin location and the destination location may be referred to as an origin and a destination, respectively. The code segments 125, when executed, use mapping information in the mapping information store 125 to determine a route, such as a shortest path between the origin and destination. In some implementations, a generated route to be displayed over bit-mapped images.

The mapping system 120 also includes a mapping query store 126 for storing information related to mapping queries. The mapping query store 126 may store information, for example, related to requests for location maps, a route between an origin and a destination, and/or driving directions from an origin to a destination. The mapping query store 126 may include a origin, a destination, and a date and time related to the query, such as when the query was received by the mapping system 120, a desired date and time of arrival at the destination, a desired departure time and date, or a travel date that does not include a particular time. The mapping query store 126 also may include a suggested route associated with a query. The mapping query store 126 may be configured to store queries for a predetermined duration (e.g., a week, three days, or twenty-four hours). Periodic flushes of mapping query store 126 may help to delete stale information and improve the efficiency of the mapping system 120.

The mapping system 120 includes code segments 127 configured to compare a mapping query to other mapping queries stored by the mapping query store 126 to determine or predict a potential or an emerging event. The mapping system 120 may compare client queries based on the time constraints. For example, the mapping system 120 may predict an emerging event by comparing queries received in the same time window. Hence, the mapping system 120 may identify queries arriving within a ten minutes period and/or queries requesting maps or driving directions to the same location. In another example, the mapping system 120 may relate queries specifying the same day/time as the travel date to a given destination. In yet another example, the mapping system 120 may predict an event by comparing differences in popularity for a location. Therefore, events related to widely popular locations (e.g., demonstration in front of White House) may be predicted by comparing a level of queries within a particular time period with a historical number of queries for these locations.

The mapping system 120 includes a predicted event store 128 for information about predicted events. For example, the stored data may include the type of an event, event name, predicted time/date of an event, certainty of event's occurrence, and other event information. Additionally, the event data stored by the predicted event store 128 may be linked to client query data stored by the mapping query store 126. This may help provide or offer services related to the predicted event to a user of the client system 105A, 105B.

The mapping system 120 may use the data stored in the predicted event store 128 to notify the client systems 105A, 105B about the predicted event. In addition, the mapping system 120 may provide information to the client systems 105A, 105B directly or may obtain the additional information about the event from another source, such as an information server, and then provide this information to the client systems 105A, 105B. For example, the mapping system 120 may send the client systems 105A, 105B a notification message indicating that, due to television coverage, kickoff time for a football game has been moved up by an hour, or suggest dining locations open past midnight around a concert arena. In another example, the mapping system 120 may supply the client systems 105A, 105B with the information related to anticipated traffic conditions associated with the event, such as an alternative route to or from a concert arena, or anticipated parking conditions at a stadium.

Figure 2:
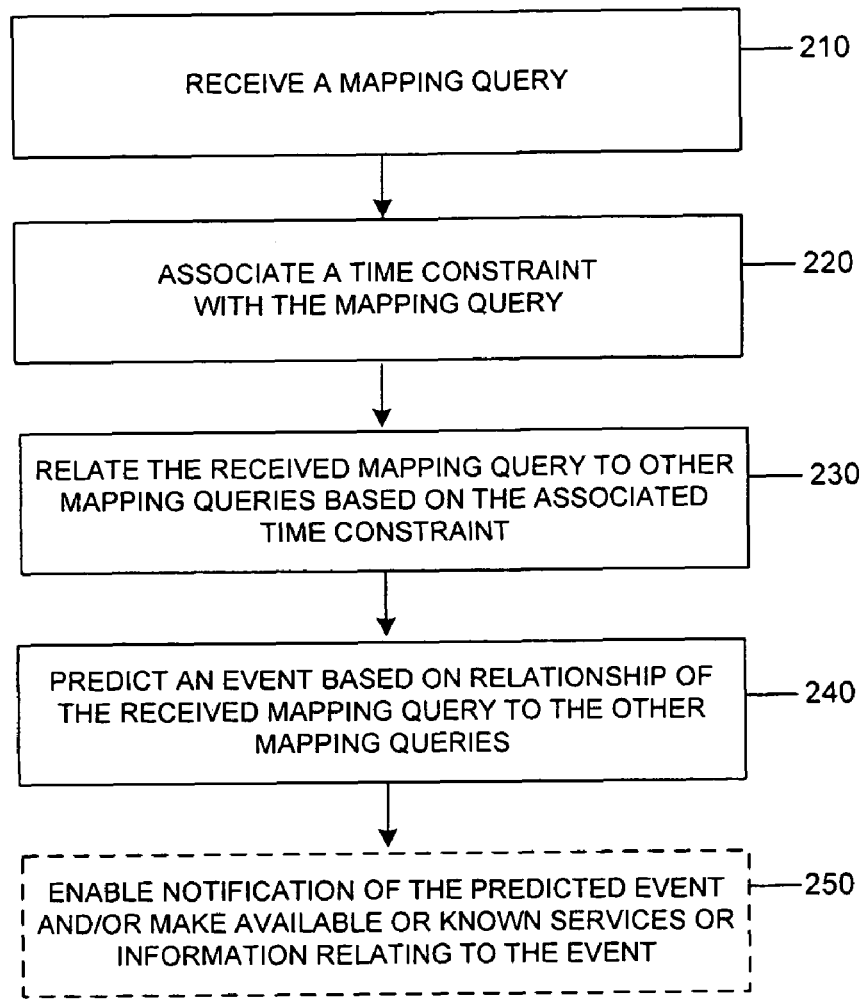
FIGS. 2 and 8 are flow charts of processes for predicting an event by relating multiple mapping queries.

FIG. 2 shows a process 200 for predicting an event by relating multiple mapping queries. The process 200 may be performed by a processor executing on a mapping system, such as mapping system 120 of FIG. 1, or executing on a system configured to detect an event based on mapping queries without necessarily being configured to provide mapping information, as described more fully later.

The processor receives a mapping query (210). For example, the processor may receive a mapping query sent from a client system. The mapping query may be, for example, a request for a suggested route and/or driving directions between two locations, a request for a street map of an address, or a request for a map of a general location.

The processor associates a time constraint with the query (220). For example, the processor may associate with the mapping query a time and/or date when the mapping query was received. To do so, the processor may add a timestamp to a received mapping query when the mapping query is placed in a mapping query store or executed thereafter. The time constraint associated with the query may reflect an expected date and/or time of travel that is entered by the user. In one example, a mapping system may prompt a user to provide a date and/or time constraint related to a planned travel time, such as general expected date of travel, destination arrival time, and/or origin departure times. In such a case, the time constraint information may arrive as a part of the mapping query or the mapping system may obtain the time constraint from a user through a separate request.

The processor relates the received mapping query to other mapping queries based on the associated time constraint (230). For example, the processor may relate received queries if the queries are related to the same location and are received in the same time window (e.g., 10 minutes, same day, same week). In a more particular example, the processor may relate all queries directed to finding a map of a particular dance club that are sent to the mapping system within a short time window (e.g., an hour).

The processor then predicts an event based on a relationship of the received mapping query to the other mapping queries (240). In general, the processor may use various well-known statistical data processing methods to relate the incoming mapping queries and predict the existence of events. For example, the processor may predict events based on thresholding schemes. In one such example, the processor may count the number of requests to a certain destination and flag the destination as a location of an upcoming event when the count exceeds some pre-determined threshold. Alternatively, the processor may predict an event when a percentage of mapping requests among all requests exceeds some pre-determined threshold. In yet another example, the processor may predict an event by observing the difference in popularity for a well-known location during a particular time-period. Thus, events related to widely popular locations (e.g., demonstration in front of White House) may be predicted by comparing a level of queries within a particular time window with a historical number of queries for these locations. The processor may also apply different weights to mapping requests. Hence, mapping requests to certain public locations, such as museums and stadiums, may be treated differently for event detection purposes (e.g., with higher or lower deference) than mapping requests to private residences. In another example, the processor may also detect a large number of requests to some private residence, predict a social gathering, and, consequently, provide users with the carpooling information to that location.

The processor may provide users with a notification of the predicted event and/or make available or known services or information relating to the event (250). For example, the processor may alert users that due to inclement weather, or that the start of a football game has been moved up by an hour. In another example, the processor may suggest dining locations open past midnight around the concert arena. In yet another example, the processor may supply users with information related to anticipated traffic conditions associated with the event, such as providing a suggested alternative route to or from the location of the event, or providing information related to anticipated parking conditions for the event. The processor may also match users with other people, services, additional commercial opportunities based on when the user will be traveling. Time-of-travel prompts also may be presented in response prediction of an event that the user is likely to be attending. One example of a time-of-travel prompt is an active control that is presented: "Click here if you will be traveling to this destination this afternoon." In response to the user activating the control, a user interface that is configured to provide enhanced services based on confirmation of travel time by the user may be displayed on the client system.

FIG. 3 depicts an example of mapping queries 340 received within a particular period of time. As shown, each of the mapping queries 340A-340L was received between 3:00 pm and 3:47 pm of a particular day. The mapping queries 340A-340L include an origin address 310 of the mapping query when an origin is applicable to a query, such as when a query requests a suggested route or driving directions between an origin and a destination. The mapping queries 340A-340L also include a destination 320 and a time 330 associated with the query. The time 330 may represent the arrival time of the query at the mapping system or at an event detection system.

A system may use the mapping queries 340 to predict an emerging event. For example, the system may determine that during a forty-seven minute window from 3:00 to 3:47, six out of twelve mapping queries (i.e., 340A, 340D, 340E, 340G, 340J, and 340L) include a request for information related to the same destination (i.e., ABC Stadium). Based on the mapping queries, the mapping system may predict that an event is about to occur at ABC Stadium. The prediction may be based, for example, on the fact that half of the arriving queries in the time period are directed towards the ABC Stadium, or may be based on the fact that a predetermined number or threshold of queries arrived within the time period, as compared to a historical metric representing search inquires related to ABC Stadium, a non-historical threshold, or a threshold related to the genre of the search (e.g., sports, theatre performances, movies, and concerts).

Figure 4:
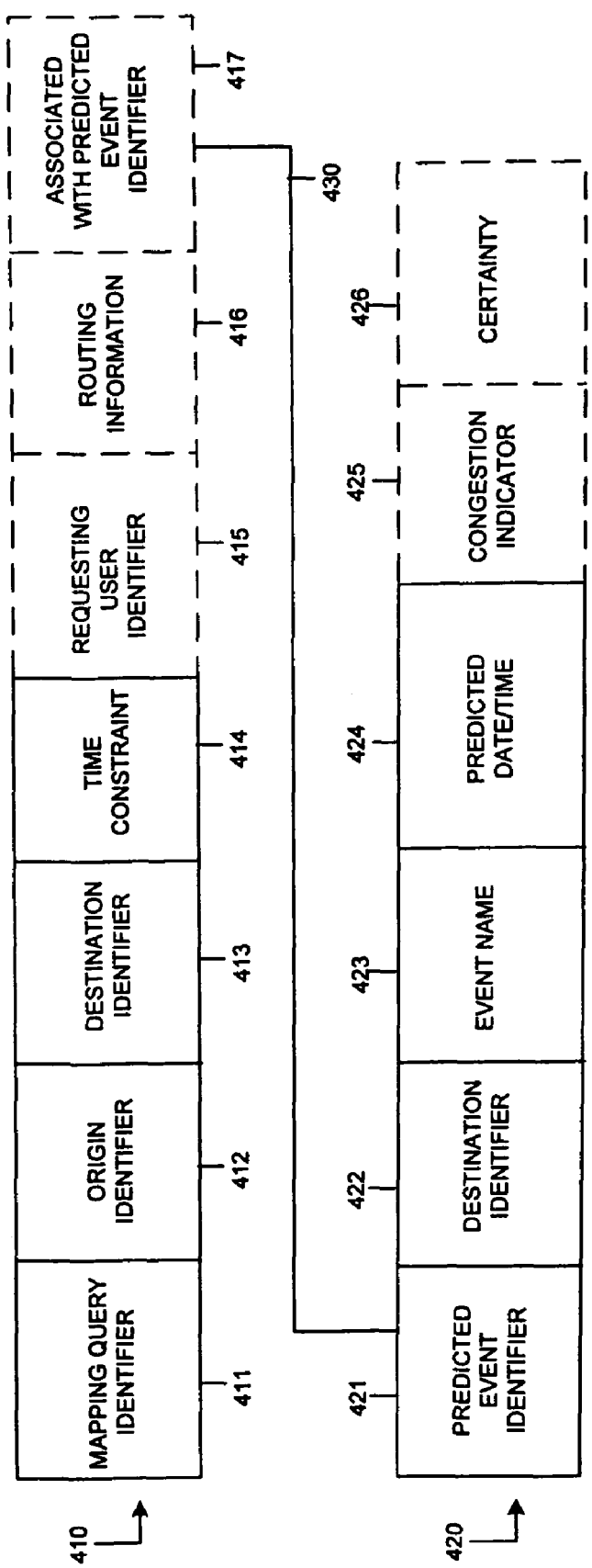
FIG. 4 is a block diagram of an example data structure used in predicting an event based on mapping queries.

FIG. 4 shows example data structures 400 for mapping information, in simplified form. The example data structures 400 includes a data structure 410 for a mapping query entry in a mapping query store, such as mapping query store 126 of FIG. 1.

The data structure 410 includes a mapping query identifier 410 that uniquely identifies a particular mapping query entry. The data structure 410 also includes origin and destination identifiers 412 and 413 to specify an origin and a destination of a mapping query. In addition, the data structure 410 includes a time constraint field 414 that may specify an arrival time for a mapping query.

The data structure 410 also may optionally store an identifier 415 that identifies a requesting user, calculated routing information 416 returned in response to a mapping query, and a field 417 linking the data structure 410 to the data structure 420 using link 430.

The example data structures 400 also includes a data structure 420 for a predicted event entry in a predicted event store, such as the predicted event store 128 of FIG. 1. The data structure 420 includes a predicted event identifier 421 that uniquely identifies an entry, a destination identifier 422 that identifies destination of the predicted event, an event name 423, and a predicted date/time of the event 424. The data structure 420 may include a congestion indicator field 425 to specify a degree of possible traffic congestion on route to the predicted event. Additionally, the data structure 420 may include a certainty field 426 to specify the predicted likelihood/certainty of the event. The data structures 410 and 420 are related through the use of predicted event identifiers 417 and 420, respectively, as shown by link 430. The relationship of 410 to 420 using link 430 may be useful to allow for incremental updates of the calculated certainty of the predicted events. For example, the system may periodically loop over the predicted event entries 420 in the predicted event store 128 and, for each entry 420, update the certainty indicator 426 based on the number of mapping query entries linked to that event entry. Typically, an increase in the number of mapping queries would increase a certainty/likelihood of a predicted event.

Figure 5:
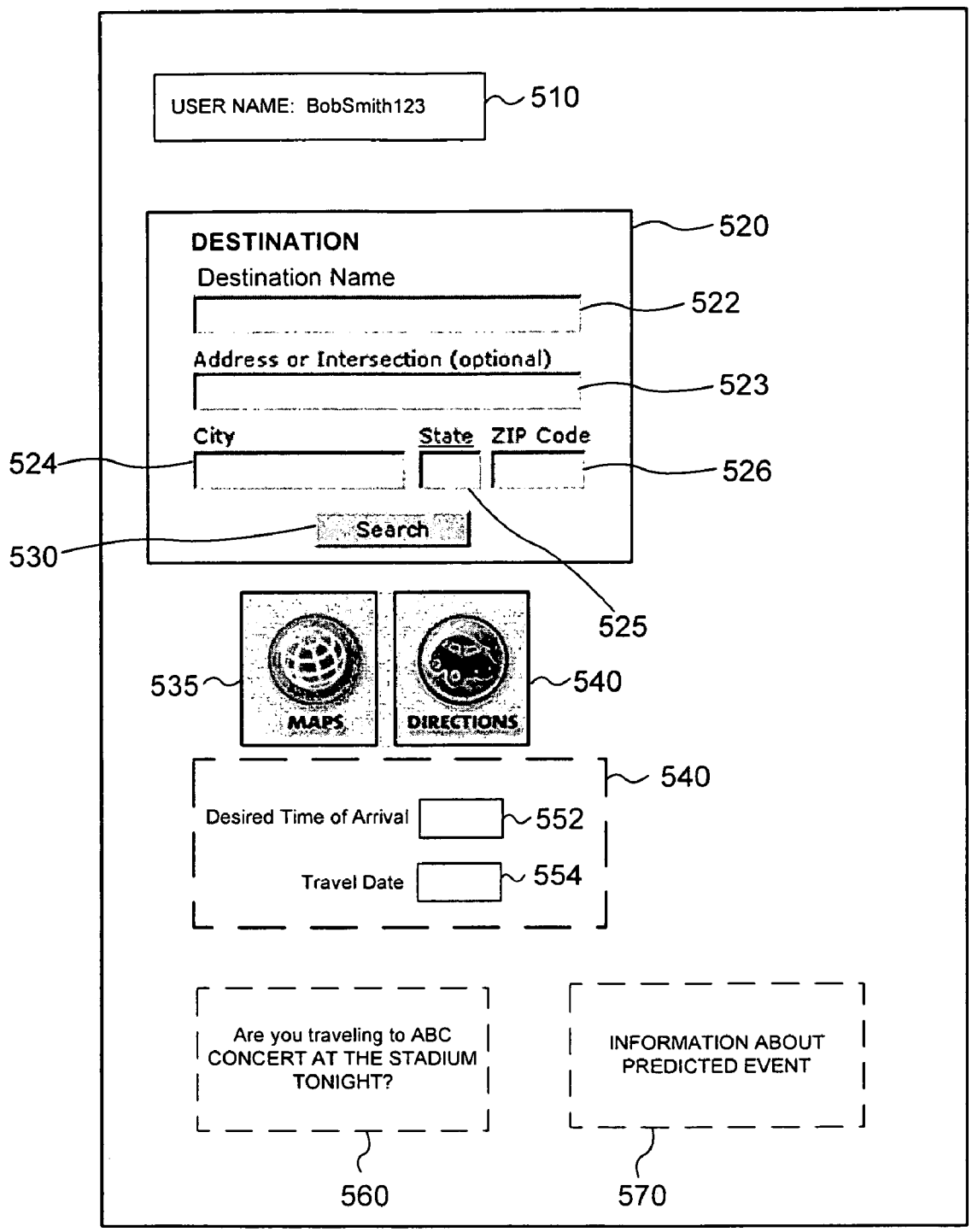
FIGS. 5 and 6 are illustrations of exemplary user interfaces for a communication system capable of predicting events.

FIG. 5 shows an exemplary user interface 500 for a communications system capable of predicting events. The user interface 500 may be presented to a user wishing to get a map of an address.

The user interface 500 includes a user identification portion 510 identifying a user who is signed on to the mapping system. The user interface 500 also includes a destination selection portion 520 that enables a user to identify a destination for which mapping information is to be provided. The destination selection portion 520 includes a destination name field 522, an address or intersection field 523, a city field 524, a state field 525, and a zip code field 526. Users may then activate a search control 530, a map control 535, or a directions control 540 to receive mapping information about the destination specified in the destination selection portion 520.

The user interface 500 also may include a travel time portion 550 that includes a field 552 to which a user may indicate a desired time to arrive at the destination identified in the destination selection portion 520. The travel time portion 550 includes an optional travel date field 554 to which a user may indicate a desired date to arrive at the destination identified in the destination selection portion 520. The travel time portion 550 may help a system improve the accuracy of an event predicted by analysis of mapping queries.

The user interface 500 also may include a prediction verification portion 560 to interrogate a user about the possible accuracy of the prediction. For example, after making an initial prediction about an event at ABC stadium, the mapping system may further question the user: "Are you traveling to ABC stadium tonight?" If the user answers affirmatively, the mapping system may display information about the upcoming event in field 570. The information displayed in field 570 may be based on information associated with a predetermined event (such as a planned concert at a particular concert venue). Additionally or alternatively, the information displayed in field 570 may include a control to present information related to the predicted event. One example of such a control is a hyperlink (such as a Hypertext Mark-up Language (HTML) link) that displays information (e.g., a web page) identified by the hyperlink. In a more particular example, a link to a web page for a particular venue (e.g., a stadium, a concert venue, or a theater) may be presented in the field 570 and, when activated, the link may be operable to display information related to an event at the venue.

On the other hand, if the user indicates that the user is not traveling to ABC stadium, the mapping system 120 may attempt to determine an alternative event prediction, or it may abort prediction attempts for the subject query to avoid user inconvenience.

Figure 6:

FIG. 6 shows another exemplary user interface 600 for a communications system capable of predicting events. The user interface 600 may be presented to a user wishing to obtain suggested driving directions between an origin and a destination. The user interface 600, for example, may be presented in response to a user activating driving directions control 540 of FIG. 5.

The user interface 600 includes a user identification portion 510 and a destination selection portion 520, described previously With respect to FIG. 5. The user interface 600 also includes an origin portion 630 that enables a user to identify an origin or starting address for which the driving directions are to be provided. The origin portion 630 includes an origin address or intersection field 633, a city field 634, a state field 635, and a zip code field 636 to identify the origin.

The user interface 600 also includes a driving direction control 640 operable to cause the generation of a route between the origin specified in the origin portion 630 and the destination specified in the destination selection portion 520.

The user interface 600 also includes a travel time portion 650 having a arrival time field 552 and an optional travel date field 554. The travel time portion 660 also includes an optional departure time field 656. The travel time portion 660 may help to increase the accuracy of an event prediction based on the mapping query identified in the user interface 600.

The user interface 600 also includes a prediction verification portion 560 to interrogate a user about the possible accuracy of the prediction and an information field 570 to display information about the predicted event.

Figure 7:
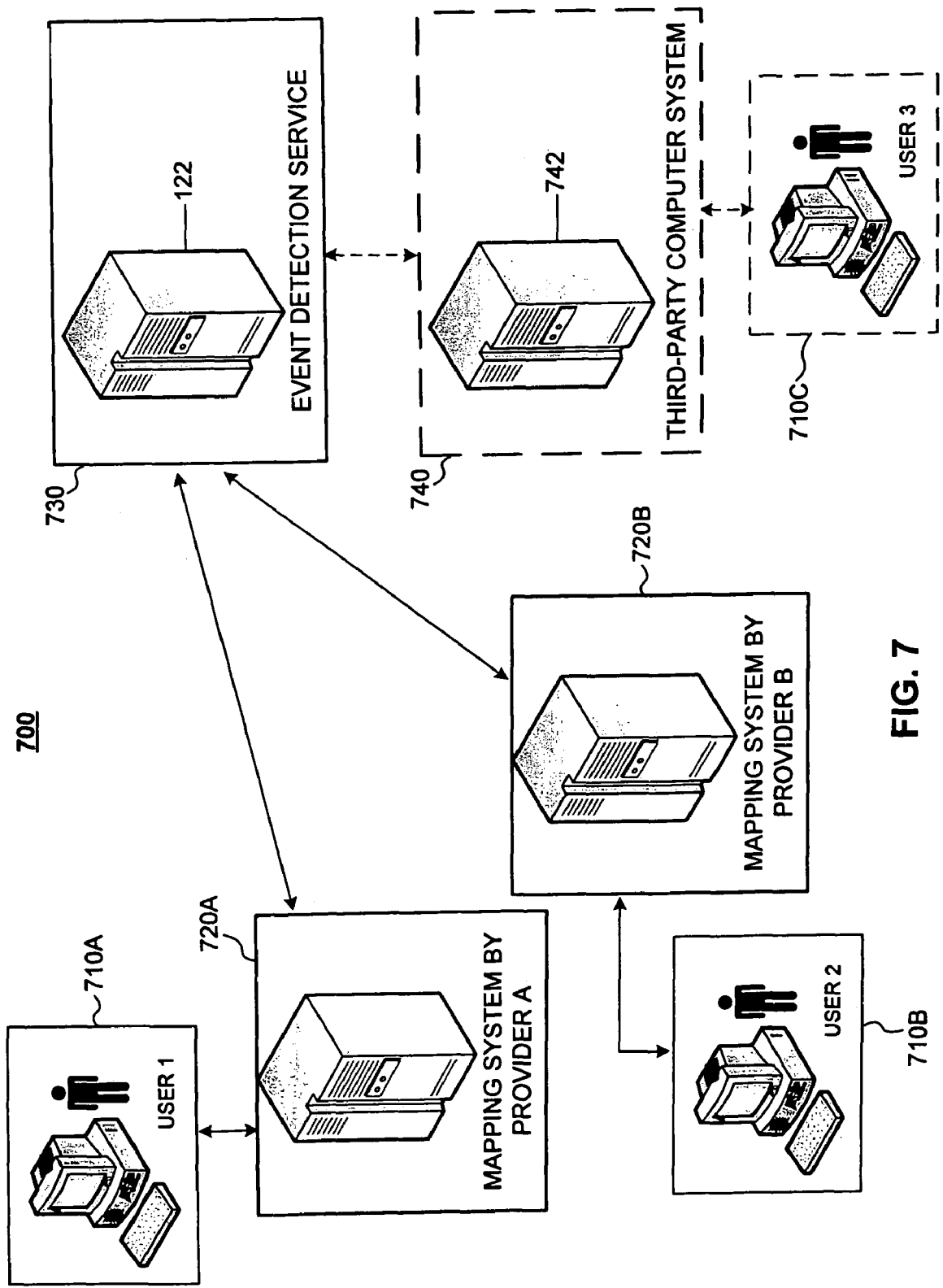

FIG. 7 illustrates a communication system 700 where the event detection service 730 is independent from the mapping system providers 720A, 720B. Users 710A and 710B access mapping service providers 720A, 720B, respectively, to obtain driving directions, a suggested route, or maps. In addition to responding to user queries, the mapping system providers 720A, 720B transmit user queries to the separate event detection service 730 for processing.

The event detection service 730 receives mapping query information from the mapping service providers 720A, 720B and relates multiple user queries to predict a potential or an emerging event. The event detection service 730 may notify the mapping service providers 720A, 720B about an emerging event. Subsequently, mapping service providers may present users 710A and 710B with information about the emerging event.

Additionally or alternatively, the event detection service 730 may also independently provide a third-party computer system 740 with information about the potential or emerging event. The third-party computer system 740 enables access to information about the potential or emerging event by a user 710C. The third-party computer system 740 may be operated by a law enforcement organization, a public safety organization, another type of a government organization, or another type of organization that is affiliated with a local, state or federal government organization. In such a case, the user 710C may a law enforcement official or other type of public service employee or agent.

In another example, the third-party computer system 740 may be operated by, or affiliated with, an organizer or sponsor of the event. In yet another example, the third-party computer system 740 may be operated by, or affiliated with, the venue at which the potential or emerging event is taking place or is predicted to take place. In another example, the third-party computer system 740 may be operated by, or affiliated with, a traffic information provider service. The use of the event detection service that is independent from the mapping system providers may be useful. For example, the event detection service 730 may use dedicated hardware and software that is optimized for event detection, the service 730 may be able to offer faster response times and higher system throughputs when compared to the systems where the event detection service 730 shares resources with the mapping services. In addition, the accuracy of the dedicated event detection service 730 may be greater than the accuracy of the event detection services tied exclusively to the specific mapping service providers. For example, the independent event detection service 730 may receive the combined input from the multiple mapping service providers, allowing it to attain more accurate predictions based on the increased number of statistical samples.

Figure 8:
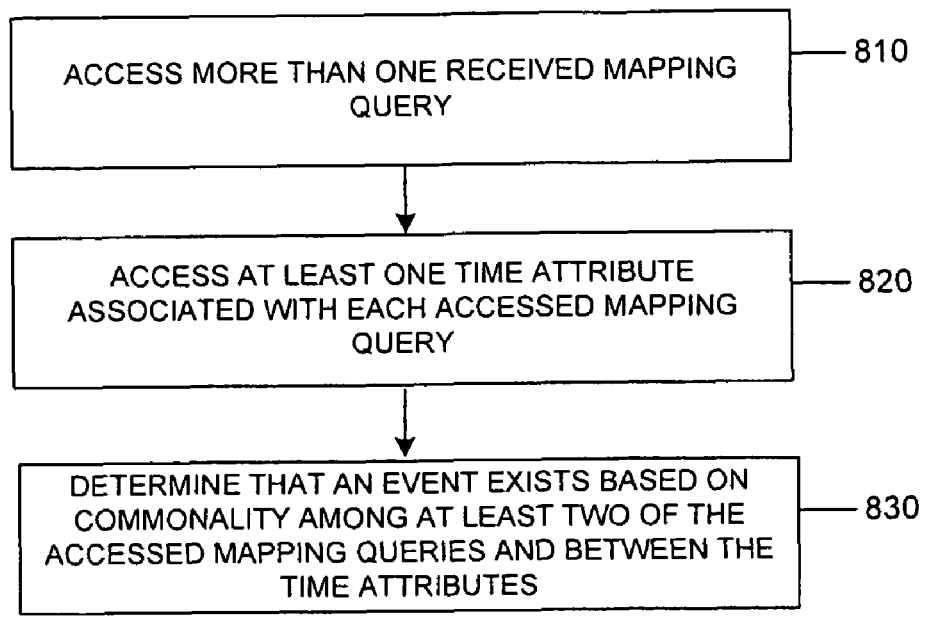

FIG. 8 illustrates another example of a process 800 for determining or predicting an event by relating multiple mapping queries. The process 800 may be performed by a processor executing on a mapping system, such as the mapping system 120 of FIG. 1, or executing on a system configured to detect an event based on mapping queries, without necessarily being configured to provide mapping information, such as the event detection service 730 of FIG. 7.

The processor accesses more than one mapping query (810). For example, the processor may access multiple mapping queries, such mapping queries 340 of FIG. 3. The processor also accesses at least one time attributed associated with each accessed mapping query (820). For example, the processor may access times 330 associated with each mapping query, as described previously with respect to FIG. 3. In other examples, the time associated with a mapping query also may include a time of intended departure, a time of intended arrival, and a time of intended arrival at an intermediary destination along a route specified in response to the mapping query. In some implementations, the processor may access mapping queries from only people known to a particular user.

The processor determines that an event exists based on commonality among at least two of the accessed mapping queries and between the time attributes associated with the mapping queries (830). The commonality may be, for example, a common destination. A common destination may be specified for the accessed mapping query, or a common destination may be deemed to exist based on, for example, a destination of a mapping query that is within a threshold distance of a destination in another mapping query. The commonality also may be a common departure point (i.e., origin) that is specified or deemed to exist based on a threshold distance of a departure point in another mapping query. The commonality may be based on a comparison of times associated with the mapping queries or a comparison of attributes of mapping queries to a common item (such as a time or a place).

In some implementations, the processor may determine that an event exists based on comparing location information specified within several mapping queries to one or more predetermined venues (such as a stadium, a sporting venue, a concert venue, or a theater) and identifying a number of mapping queries that specify the predetermined venue. The processor may determine that an event is occurring at the predetermined venue based on the number of mapping queries identified as specifying the predetermined venue. The number of mapping queries may represent, for example, a summation, a ratio, or a frequency.

Additionally or alternatively, the processor may determine that an event exists by identifying a region of interest based on commonality among at least two of the accessed mapping queries and between the time attributes respectively associated with the accessed mapping queries and by investigation criteria other than the mapping queries to identify one or more likely events occurring with the region of interest. Examples of investigation criteria include electronic information available from a local newspaper, an entertainment service, a web site associated with a predetermined venue, and a web site associated with a sponsor of, or participant in, the event (such as a sports team, a concert organizer, a theater a group of performers, or an individual performer).

In some implementations, different types of events may be predicted based on searches of mapping queries over different periods of time. For example, requests for travel submitted from one city to a different city over a longer time period (such as three months) may be sufficient to predict a particular type of event, while requests for local travel over a shorter time period (such as less than a day, a day, or several days) may be suggestive of a different type of event. To do so, for example, a mapping system may associate a time period with each of multiple event categories and analyze mapping queries based on an event category and a time period associated with the event category. Different event categories may be used to predict an event for the same or overlapping group of mapping queries.

Turning now to providing event information that is related to an identity's social network, such event information may increase the value of a mapping service or application. For example, providing such event information may provide an interface to help coordinate activity of an identity with respect to an event, which, in turn, may increase the perceived value of using a particular mapping service or application.

In general, identities who use a mapping service, and who do not have a direct relationship to another, may nevertheless be linked to one another through intermediate identities based on a personal, business or other relationship among the identities and the intermediary identities. For example, a user A may have a friend, user B, who also uses the mapping service and who has a friend, user C, who also uses the mapping service. Thus, user A is linked to user C through user B. Such interpersonal interactions or relationships may generally be referred to as a social network. How many intermediary identities are needed to link one identity with another identity may be referred to as the degree of separation between those two identities.

User contact lists (e.g., address books or buddy lists of instant messaging services) may be used to determine the links and degree of separation between two identities. For example, an identity A may list identity B in identity A's address book, identity B may list identity C in identity B's address book, and identity C may list identity D in identity C's address book. Here, identity D is linked to identity A by two degrees of separation (with identity B as the first degree and identity C as the second degree). Identity A is related to identity C by one degree of separation (identity B), and identity B is separated from identity D by one degree of separation (identity C). Identities A and B, identities B and C, and identities C and D are each respectively separated by zero degrees of separation.

Thus, a system may identify a first identity's social network (e.g., the entire social network or a portion of the social network up to a designated number of degrees of separation) by evaluating the first identity's contact list(s), evaluating the contact list(s) of those identities listed in the first identity's contact list, and so forth until the desired number of degrees have been reached or the entire social network has been identified. For example, an identity A may list identities B and C in identity's A address book. The system may evaluate and determine that identities B and C are so listed and construct a social network map (which may be visually displayed and/or stored for later use) that indicates that identities B and C are linked to identity A. The system may then evaluate identity B's address book and identity C's address book to determine additional identities with whom identity B or identity C are linked. For example, the system may evaluate identity B's address book and determine that identities D and E are listed therein and, consequently, that identity B is linked to identities D and E. The system then may refine the social network to indicate that identity A is linked directly to identities B and C and is also linked to identities D and E through identity B.

In one example, a user through interactions with a mapping system may be associated with an event that is occurring or will occur at a location. The existence of the event may be determined or predicted by the mapping system, as described previously.

The event with which a user is associated also may be a predetermined event that is otherwise known to exist (e.g., was not determined or predicted based on mapping queries). For example, the mapping system may include a table, a list or another type of data collection of venues, venue locations, and scheduled events occurring at a particular venue. The collection of predetermined venue information may be stored persistently or determined dynamically when needed for use. To obtain information about a predetermined event, for example, the mapping system may be able to communicate with an external information source, such as information provided by an electronic entertainment guide (such as a web site offered to provide entertainment options), electronic information provided by a local newspaper (such as a web site provided by a local newspaper), or electronic information provided by a ticketing service (such as a web site operated by the venue itself or a web site operated by a third-party).

A user may be associated with an event based on submission of a mapping query used to determine or predict existence of the event. A user also may be associated with an event based on direct user input. For example, a user may identify an event (e.g., by selecting from a presented list of known events or by entering the name of an event) when entering a mapping query or viewing results to a submitted mapping query. A user also may be associated with an event based on information in an electronic calendar or other type of electronic appointment information that is associated with the user.

The mapping system may provide identification information of identities in the user's social network who are also attending (or planning to attend) the same event. This may be accomplished based on the association of identities with the event. For example, a mapping query or results user interface may include a control to indicate a desire by the user to find identities in the user's social network who are also planning to attend the event. In one example, a checkbox may be presented by which a user may indicate a desire to find friends or friends of friends who are also attending this event. This may help to enable a user to share transportation to and/or from the event, enrich the user's experience at the event by sharing the experience with friends or acquaintances within the user's social network, and expand the experience by meeting friends before or after the event for an additional social experience (e.g., meet for dinner before the event and/or meet for drinks after the event).

Turning now to a user in transit, a user may be assisted by determining a route to a destination based on a route partially completed by a ground-based vehicle. Such a determination may increase the ease of using an in-vehicle navigation system and increase the accuracy of predicting an event at a destination. For example, if an in-vehicle navigation system predicts the destination a user is traveling to, the user may be able to select a destination more easily and safely because the user may not have to divert as much attention to the in-vehicle navigation system in entering a destination. In addition, if the in-vehicle navigation system predicts the destination on a trip where the user would not otherwise enter the destination due to route familiarity, more data may be available to an event detection service to more accurately predict events.

Figure 9:
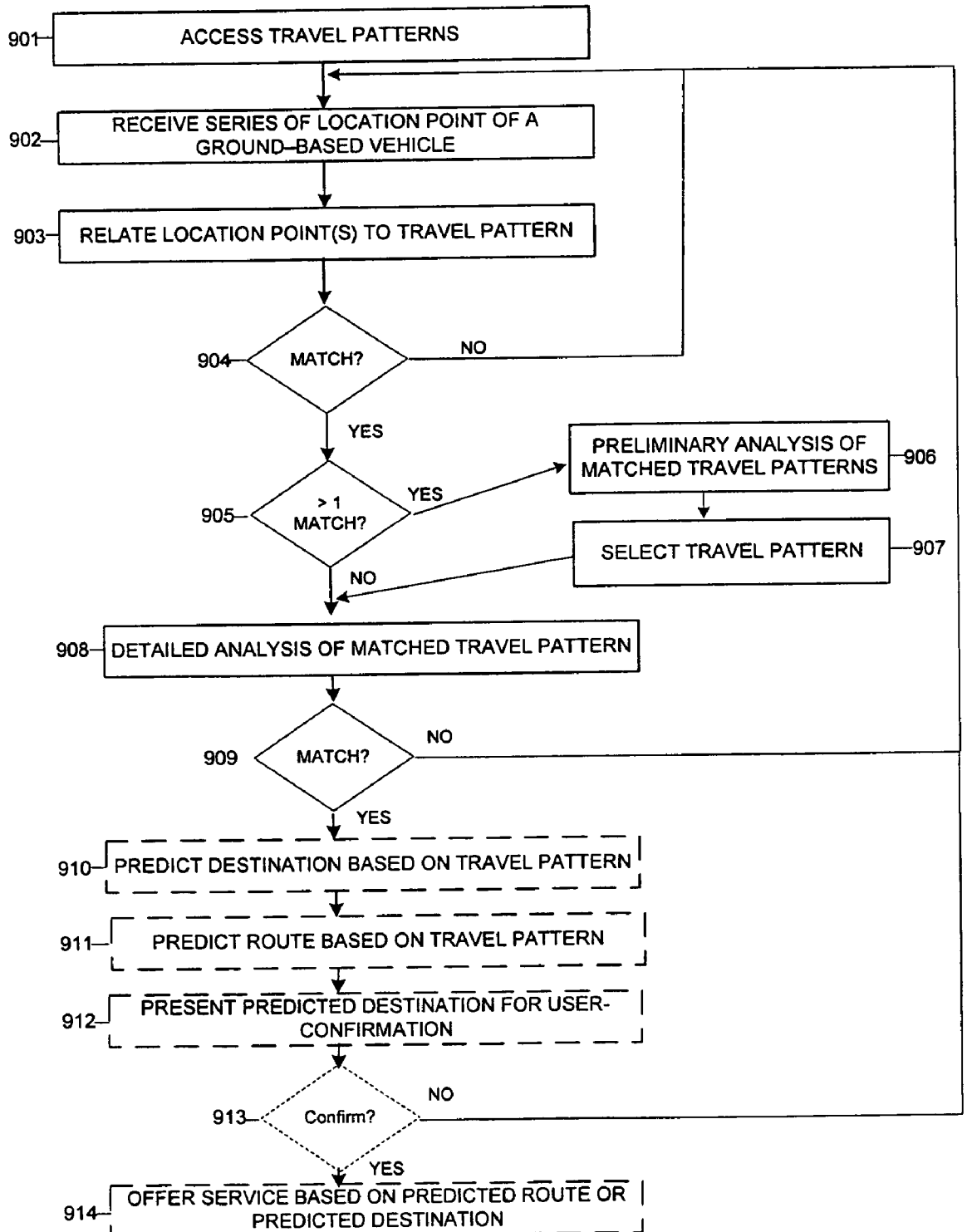
FIG. 9 is a flow chart of an exemplary process by which a route to a destination is determined based on a route partially completed by a ground-based vehicle.

FIG. 9 is a flow chart 900 of an exemplary process by which a route to a destination is determined based on a route partially completed by a ground-based vehicle. Generally, the operations shown in flow chart 900 may be used in conjunction with the systems and configurations described in FIGS. 11-16. For example, the travel patterns and stops may be generated using the UIs shown in FIGS. 14-16. Similarly, the systems used in flow chart 900 may use the underlying systems and componentry described with respect to FIGS. 11-13. For convenience, particular components and data formats described in the application are referenced as performing the process. However, similar methodologies may be applied in other implementations where different components are used to define the structure of the system, or where the functionality is distributed differently among the components shown. The operations may be performed, for example, on an in-vehicle system, on a portable device of a person in a vehicle, or on a remote server.

The operations in flow chart 900 are described generally as being performed on a processor. In one implementation the processor includes an in-vehicle navigation system. In another implementation the processor includes a host receiving information from a client in a mobile environment.

Initially, travel patterns are accessed (901). Typically, accessing travel patterns includes accessing one or more routes traveled by a user on an earlier occasion. For example, a host may access a user profile descriptive of a user's past travel, the frequency of the travel, the times of the travel, and/or relations of a user's travel to other user's travels. The travel patterns may be stored locally on a device proximate to the user performing the operations, or remotely on a separate system or device (e.g., removable storage or a remote host). The travel patterns may be represented in a variety of formats and used in a variety of configurations. For example, travel patterns may be based on past routes traveled by the user or the vehicle. Specifically, the travel pattern may be based on a sequence of position data, such as position data provided by a GPS receiver, for a past route traveled by the user. When a route is identified, the route may be added to a travel pattern. The travel pattern may be recorded on a historical basis so that "common" routes, that is, routes traveled with greater frequency may be identified. Travel patterns based on user-provided information may be accessed. For example, a user may enter information relating to routes that the user typically travels or plans to travel. The user may specify, for example, the origin, the destination, the frequency of travel, the likely time of travel, and the likely day of travel to increase the accuracy of correctly predicting the route. The user also may enter information relating to the stops the user may make when traveling along a route.

In another example, travel patterns may be accessed that are based on predetermined common routes or routes set by a third party. The processor may initially include common travel patterns and related points of interest that are determined to represent frequently visited destinations. For example, one predetermined travel pattern may include a route to Disney World because Disney World is a popular attraction and a user traveling unexpectedly in the direction of Disney World may be destined for Disney World.

Travel patterns may be specified by a third party, such as a system administrator or municipal authority. For example, a third party may realize that a sporting event occurs on a particular day, at a particular time, and, as a result, set a travel pattern for the sporting event in anticipation of many people traveling along a "common" route. Similarly, a host may predict the occurrence of an event and identify a travel pattern based on that event. In addition, the travel pattern may be associated with a particular vehicle or a particular user. For example, a travel pattern may be associated with a vehicle, such as a bus or a rental car, where the vehicle often travels to a location (e.g., a bus follows a particular route and a rental car routinely visits points of interest or hotels) even when different users are driving the same vehicle. In this example, the different users may benefit from information gleaned from other routes that other users of the vehicle have traveled. Separately or in addition, travel patterns may be associated with a user that often travels to a destination using different vehicles. For example, a user with multiple vehicles, a person not licensed to drive(e.g., a blind person) and/or a person who frequently travels by taxi, car service, or rides with friends may frequent one or more destinations. In this case, the person driving the user can gain the benefit of predicting routes that the user has previously traveled or configured.

After accessing the travel patterns, the processor receives a series of location points of the vehicle (902). The location point of the vehicle may be obtained, for example, by using satellite location data, such as GPS, or by starting with a reference location point and determining a location point based on the distance and direction traveled from the reference point. When a host is performing some or all of the operations, the vehicle may communicate the location point of the vehicle to the host. Next, the processor relates the location point received and past points received for the particular trip with the travel patterns (903). The comparison analyzes the location point or points received and determines whether the location point or points are found in the travel patterns. The processor determines whether the location point or points received matches any of the travel patterns (904). If the location point or points received does not match any of the travel patterns, another location point of the vehicle may be used, for example, by returning to operation 902. If the location point or points received matches one or more of the travel patterns, the processor determines whether multiple travel patterns match the location point or points (905). If only one travel pattern matches the location point or points, a detailed analysis of the matched travel pattern may be performed (908). If multiple travel patterns match the location point or points, a preliminary analysis of the matched travel patterns may be performed (906). Performing the preliminary analysis of the matched travel patterns may include analyzing the matched travel patterns to determine which one of the travel patterns is most likely to be the route traveled by the ground-based vehicle. Performing a preliminary analysis may include analyzing many factors, such as the number of location points in common with each travel pattern, the likely time of day the travel pattern is traveled, the likely day the travel pattern is traveled, and/or the frequency the route is traveled. After performing the preliminary analysis, the travel pattern that the vehicle is most likely traveling is selected (907) and the processor performs a detailed analysis of the matched travel pattern (908).

In order to perform a detailed analysis of the matched travel pattern (908), multiple factors of the travel pattern may be analyzed. For example, instead of analyzing multiple travel patterns to determine which travel pattern is most likely to be the pattern the vehicle is following (907), the detailed analysis of the matched travel pattern (908) may determine if the information relating to the single travel pattern analyzed is sufficiently close to the information relating to the current route of the vehicle to be reasonably confident that the particular travel pattern represents the route the vehicle is traveling. For example, the analysis may consider the number of location points in common with the travel pattern, whether the time of day matches the likely time of day for the travel pattern, whether the day matches the likely day for the travel pattern, and the frequency with which the travel pattern is traveled. The analysis also may emphasize whether the more recently received locations match the particular travel pattern and also consider whether other events, such as known or historic traffic congestion, explain deviations from the path of the travel pattern. After analysis, the processor determines whether the route of the vehicle is sufficiently close to the information relating to the travel pattern to be reasonably certain that the vehicle has traveled that particular travel pattern (909). If the analysis is not sufficient, the processor gathers more location points of the vehicle in an attempt to predict if the vehicle is following a travel pattern (e.g., by returning to operation 902). If the analysis is sufficient, the travel pattern is determined to be the path the vehicle has traveled and further processing may be done to predict a route or destination based on the travel pattern.

Although a particular sequence of operations is described as determining the travel pattern for a vehicle, many other examples could be used. For example, the processor need not use all of the past location points in a trip when comparing location points to travel patterns (903). In another example, one operation may be used to compare all possible travel patterns together.

After determining the likely travel pattern that a vehicle has traveled, a destination based on the travel pattern is predicted (910). If the travel pattern leads to only one destination, the one destination may be selected as the predicted destination of the vehicle. If the travel pattern leads to multiple destinations, multiple factors may be analyzed to predict a destination for the vehicle. For example, the analysis may determine whether a destination is a likely destination based on day (e.g., Sunday or Monday), time of day, frequency to which a destination is traveled, whether a destination is a popular point of interest, and/or whether a destination is known to be hosting an event. After predicting a destination, the predicted destination may be presented to the user for confirmation (912). After confirming the destination, the destination is set and a route to that destination may be determined. If the user does not confirm the destination, the destination is not selected (913). As a result, the processor returns to operation 902 to receive more location points in order to better predict the destination (913). When analyzing travel patterns prior rejection of a destination may be used to predict the destination. A user may confirm (913), for example, by selecting a button on a graphical user interface and/or using a voice command.

If the travel patterns relate to multiple destinations when trying to predict a destination and a specific destination cannot be determined, an operation may be executed to determine the likely route of the vehicle (911). For example, the proximity of different destinations to each other may be analyzed and, if a vehicle would travel the same route to reach some or all of the destinations (e.g., many destinations may be located within a few blocks in a city where one highway may be used to reach all of the destinations), the route of the vehicle may be predicted and presented to the user for confirmation (912). Similar to confirming the destination as discussed above, a user may confirm the predicted route (913). As a result, a processor may be configured to use the predicted route that has been confirmed. While traveling along the predicted route, the processor may return to operation 902 and use newly-received location points and the predicted route to predict the destination. If the user does not confirm the predicted route, the processor may return to operation 902 in attempting to predict the destination and/or route. For example, a processor may take into account that a previously predicted route has been rejected by the user.

If a predicted destination or predicted route has been selected, the processor may offer services based on the predicted destination or predicted route (914). For example, the processor may determine a route to the predicted destination, may provide navigation services along the predicted route, may provide information about the predicted destination or predicted route, and/or may suggest stops along the predicted route.

Figure 10:
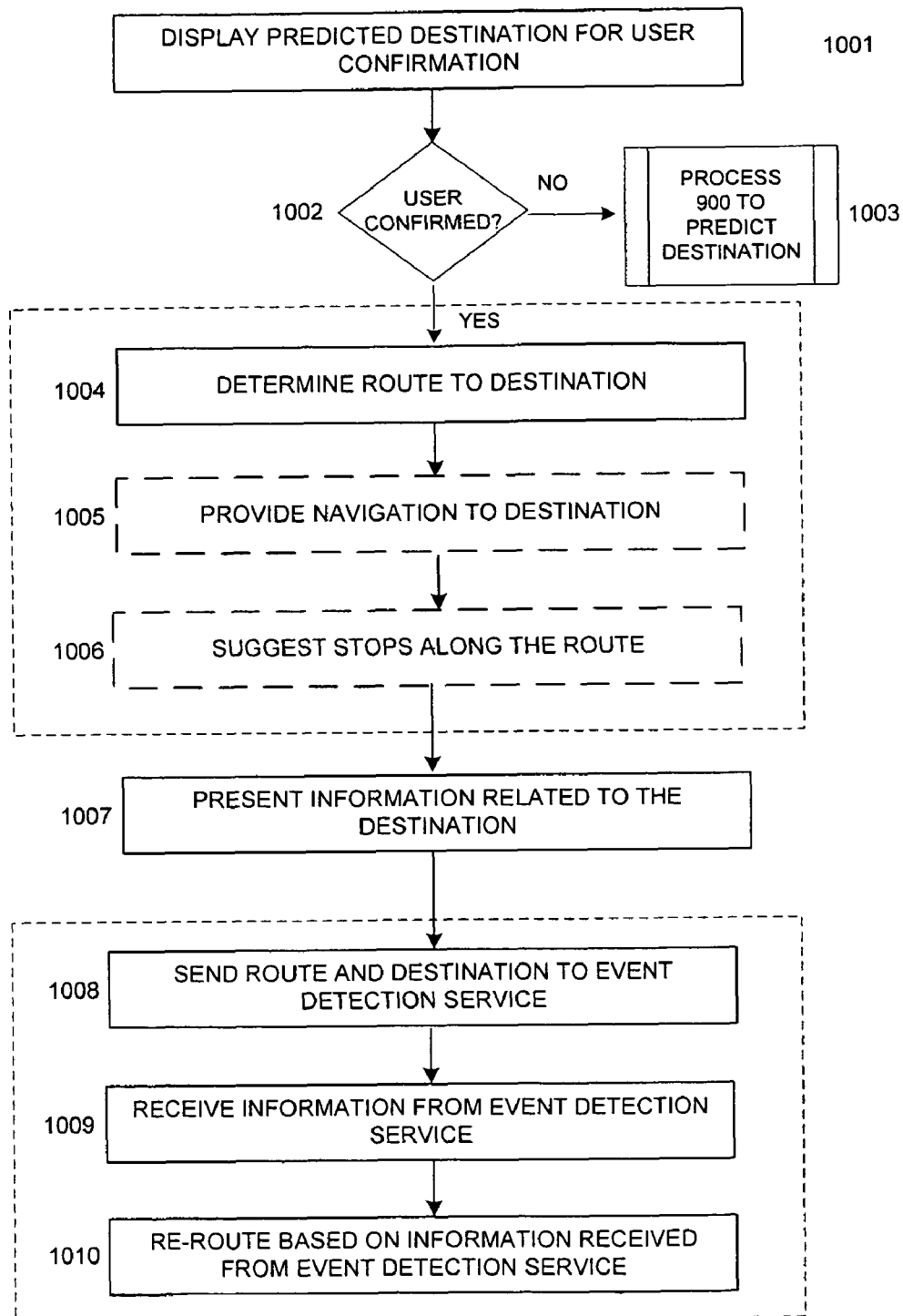
FIG. 10 is a flow chart showing an exemplary process by which a user can confirm a predicted destination and the operations that result based on the confirmation.

FIG. 10 is a flow chart 1000 of an exemplary process by which a user confirms a predicted destination and the operations that result based on the confirmation. Flow chart 1000 illustrates in greater detail operations 912, 913, and 914 shown in FIG. 9.

After a predicted destination or predicted route has been determined, the predicted destination or predicted route is displayed for user confirmation (1001). The user may confirm or not confirm a predicted destination (1002). Confirming a predicted destination may be performed in a variety of manners, such as selecting a button on a graphical user interface or using a voice command. If the user does not confirm the predicted destination, the processor returns to the operations shown in flow chart 900 to generate a predicted destination that the user will confirm (1003). The processor may use an indication that a destination has been rejected when subsequently attempting to generate a predicted destination.

If the user confirms the predicted destination, the route to the predicted destination is determined (1004). The route to the predicted destination may be displayed to the user and driving directions may be suggested. Optionally, a processor may provide the user navigation along the route to the predicted destination (1005). Stops along the route also may be optionally suggested to the user (1006). For example, businesses frequented by motorists, such as gas stations or restaurants, located along the predicted route may be suggested to the user. If the user desires to make the suggested stop, a route to the stop may be determined and navigation to the stop may be provided to the user (not shown).

In addition, information related to the predicted destination may be presented to the user (1007). The information provided may be date specific, such as an indication of an event taking place at the destination (or near the destination on that date), or may be general (e.g., interesting facts about the predicted destination or points of interest near the predicted destination). The information, for example, also may include parking information for the predicted destination or cost of admission to an attraction at the predicted destination.

The predicted route and predicted destination also may be provided to an event detection service (1008). By providing the predicted route and predicted destination information to an event detection service, a processor may be able to more accurately predict an event or assess the amount traffic traveling to the predicted destination. Information from the event detection service also may be received (1009). For example, the event detection service may provide information that an event is taking place at the predicted destination, information relating to the event, such as price or parking information, information about potential/actual traffic congestion to the event, alternate routes to the event, and/or information descriptive of other people in the user's network of friends that are also traveling to the event. A processor may reroute based on the information received from the event detection service (1010). For example, if information received from the event detection service suggests that the current route has a large amount of traffic congestion, an alternative route may be calculated.

Figure 11:
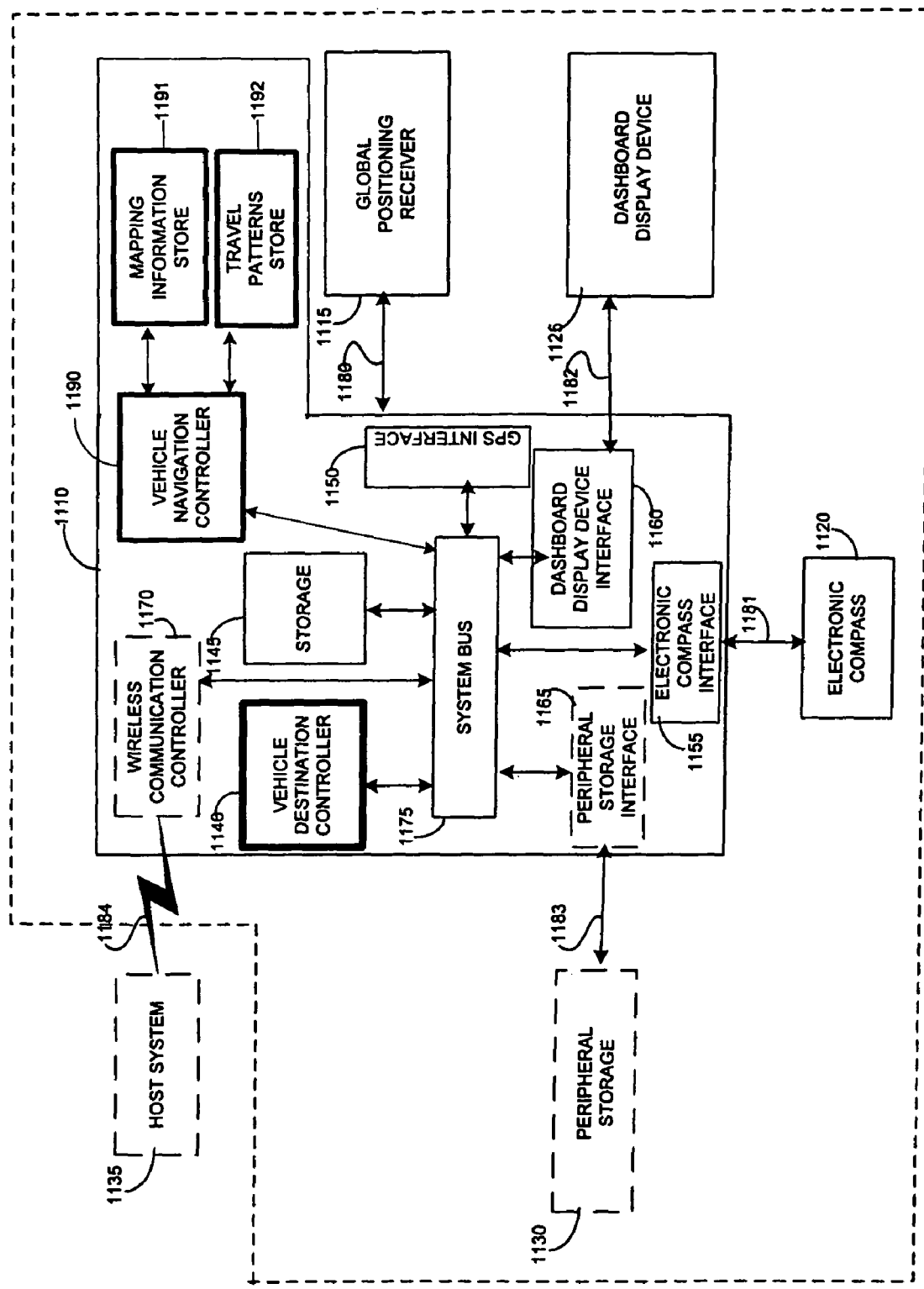
FIG. 11 shows an exemplary in-vehicle navigation system capable of determining a route to a destination based on a route partially completed by a ground-based vehicle.

Referring to FIG. 11, an exemplary in-vehicle navigation system 1100 is shown that may be configured to determine a route to a predicted destination based on a route partially completed by a ground-based vehicle. In particular, FIG. 11 shows an exemplary in-vehicle navigation system that may perform the operations shown in FIGS. 9 and 10. Although an in-vehicle navigation system is shown, 1100 may include, for example, a portable device or storage unit that a user can take from vehicle to vehicle.

The in-vehicle navigation system 1100 includes a map display, navigation, and destination prediction system 1110, a GPS receiver 1115, an electronic compass 1120, and a dashboard display device 1125. The system 1100 optionally includes a peripheral storage device 1130 and a host system 1135. Typically, the map display, navigation, and destination prediction system 1110, the GPS receiver 1115, the electronic compass 1120, the dashboard display device 1125, and the optional peripheral storage device 1130 are physically located in a vehicle traveling a route (as indicated by the dotted line).

The map display, navigation, and destination prediction system 1110 includes a vehicle destination controller 1140, storage 1145, a GPS interface 1150, an electronic compass interface 1155, a dashboard display device interface 1160, an optional peripheral storage interface 1165, an optional wireless communication controller 1170, a system bus 1175, a vehicle navigation controller 1190, a mapping information store 1191, and a travel patterns store 1192. The vehicle destination controller 1140 and vehicle navigation controller may include central processing units (CPU) that process executable instructions. The storage unit 1145 may store executable instructions and data.

The GPS interface 1150 may be configured to exchange messages with GPS receiver 1115 through communications pathway 1180. The electronic compass interface 1155 may be configured to exchange information with electronic compass 1120 through a communication pathway 1181. Dashboard display device interface 1160 is capable of sending and receiving communications with the dashboard display device 1125 through a communications pathway 1182.

The peripheral storage interface 1165 is capable of sending and receiving communications with the peripheral storage device 1130 through a communications pathway 1183. In one implementation, the peripheral storage interface 1165 is used when the map display, navigation, and destination prediction system 1110 includes a peripheral storage device 1130.

The wireless communication controller 1170 is capable of exchanging wireless communications with the host system 1135 through a wireless communications pathway 1184. The system bus 1175 may be configured to enable communications between the vehicle destination controller 1140, the storage unit 1145, the GPS interface 1150, the electronic compass interface 1155, the dashboard display device interface 1160, the peripheral storage interface 1165, the wireless communication controller 1170, and the vehicle navigation controller 1190.

The GPS receiver 1115 includes a location determination system configured to determine the location of a vehicle, for example, by longitude and latitude coordinates. The GPS receiver 1115 is configured to send the location of the vehicle to the vehicle destination controller 1140 and the vehicle navigation controller 1190 using the communications pathway 1180, the GPS interface 1150, and the system bus 1175.

The electronic compass 1120 includes a direction indicator configured to determine the direction in which the vehicle is traveling. As shown, the electronic compass 1120 is configured to send the direction in which the vehicle is traveling to the vehicle destination controller 1140 and the vehicle navigation controller 1190 using the communications pathway 1181, the electronic compass interface 1155, and the system bus 1175.

The vehicle destination controller 1140 includes a software controller configured to access a route map and travel patterns. As shown, the vehicle destination controller 1140 is configured to access a route map from the mapping information store 1191 and travel patterns from the travel patterns store 1192 using the vehicle navigation controller 1190 and the system bus 1175. The mapping information store 1191 and the travel patterns store 1192 may receive a route map and travel patterns from the storage unit 1145 using the system bus 1175 and the vehicle navigation controller 1190. The mapping information store 1191 and the travel patterns store 1192 also may receive a route map and travel patterns from the host system 1135 using the communications pathway 1184, the wireless communication controller 1170, system bus 1175, and the vehicle navigation controller 1190. The mapping information store 1191 and the travel patterns store 1192 also may receive a route map and travel patterns from media associated with the peripheral storage device 1130 using the communications pathway 1183, the peripheral storage interface 1165, the system bus 1175, and the vehicle navigation controller 1190.

The vehicle destination controller 1140 is configured to receive messages from the GPS receiver 1115 and the electronic compass 1120, and uses the messages to determine on which travel pattern, if any, the vehicle is currently traveling. The vehicle destination controller 1140 may compare information about the current location of the vehicle and the direction in which the vehicle is traveling as received from the GPS receiver 1115 and electronic compass 1120, respectively, with the travel patterns to determine on which travel pattern the vehicle is traveling. When the vehicle destination controller 1140 determines on which travel pattern the vehicle is traveling, the vehicle destination controller 1140 generates the predicted destination the vehicle is traveling to. In determining a predicted destination, the vehicle destination controller 1140 displays the predicted destination on the dashboard display device 1125 and requests the user to confirm the destination. For example, the vehicle destination controller 1140 may send a representation of the predicted destination through system bus 1175 to the dashboard display device interface 1160. The dashboard display device interface 1160 then displays the predicted destination using communication pathway 1182 on the dashboard display device 1125. If the user confirms the predicted destination, the predicted destination is set and the vehicle destination controller 1140 sends the correctly predicted destination through system bus 1175 to the vehicle navigation controller 1190. If the user does not confirm the predicted destination, the vehicle destination controller 1140 may be configured to continue generating predicted destinations.

When no predicted destination is set and the vehicle destination controller 1140 is attempting to generate a predicted destination, the vehicle navigation controller 1190 may be configured to display a route map and the position of the vehicle on the dashboard display device 1125. For example, the vehicle navigation controller 1190 may be configured to receive the route map from the mapping information store 1191 as well as information about the current location of the vehicle and the direction in which the vehicle is traveling from the GPS receiver 1115 and electronic compass 1120, respectively. Using the route map, the current location of the vehicle, and the direction in which the vehicle is traveling, the vehicle navigation controller 1190 may be configured to display the route map and vehicle position and sends the display to the dashboard display device 1125 through the system bus, 1175, the dashboard display device interface 1160, and the communications pathway 1182.

The vehicle navigation controller 1190 may be configured to receive the predicted destination from the vehicle destination controller 1140 through the system bus 1175. After receiving the destination, the vehicle navigation controller 1190 may be configured to determine a route to the predicted destination using information obtained from the mapping information store 1191. The vehicle navigation controller 1190 may be configured to display the route information on the dashboard display device 1125, and to provide navigation as the vehicle travels along the route. For example, the vehicle navigation controller 1190 may alert the user when a turn is approaching or re-route the user when the user misses a turn or goes off course. In addition, the vehicle navigation controller 1190 may provide information about the destination to the user. For example, the vehicle navigation controller 1190 may provide information informing the user about points of interest located near the destination or that an event is taking place at the destination. The vehicle navigation controller 1190 may also provide information to the user about parking at the destination or the level of traffic along the route to the destination.

In addition, the vehicle navigation controller 1190 may be configured to suggest stops to the user. The vehicle navigation controller 1190 may recommend stops based on certain factors, such as time of day or level of gas in the tank. The vehicle navigation controller 1190 may be configured to receive information stored in advance or received in real time. For example, the vehicle navigation controller 1190 may obtain information relating to the destination from the mapping store information 1191, the travel patterns store 1192, the storage unit 1145, media associated with the peripheral storage 1130, or the host system 1135 through wireless communication. Moreover, information obtained by the vehicle navigation controller 1190 may be information generated by a third party, information generated by the user, or information predicted by another system or device, such as the host system 1135. In addition, the information provided to the user may be supplied by an event detection service as described above.

Although one configuration for system 1100 is shown, other configurations may be used. For example, the vehicle destination controller 1140 and the vehicle navigation controller 1190 may be consolidated on a single processor.

Figure 12A:
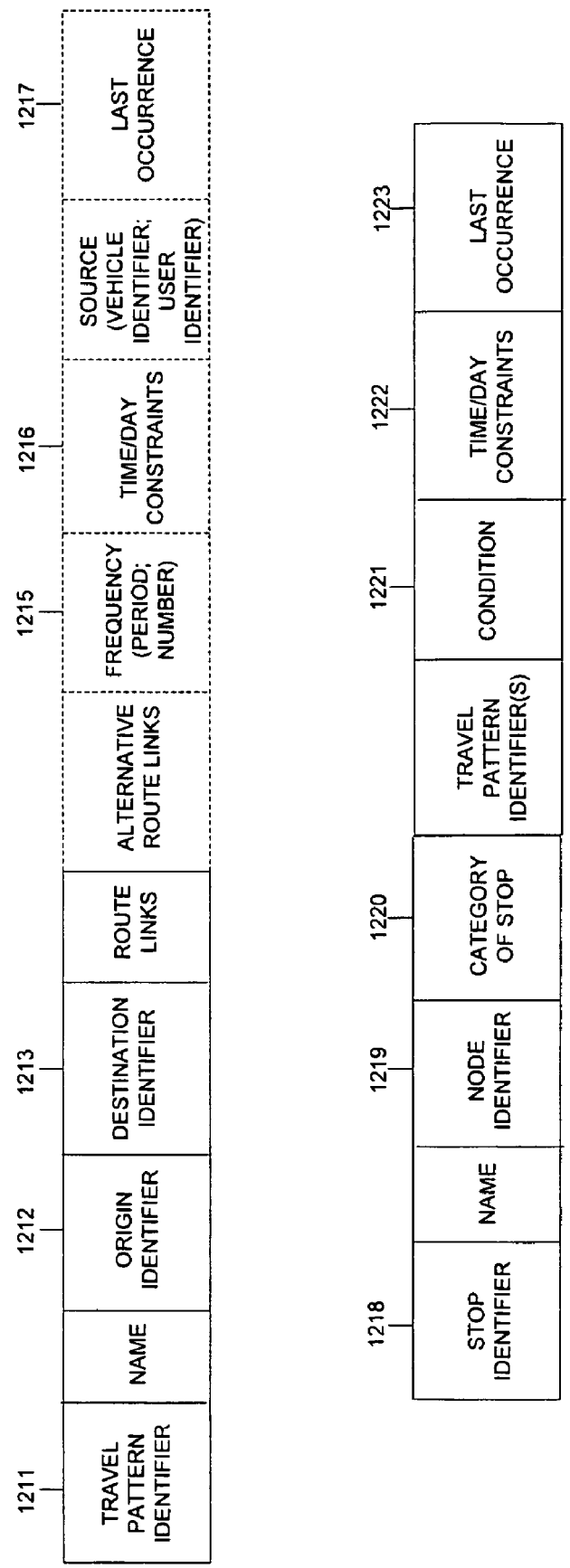
FIG. 12A-12C show examples of the data structures that may be used.

FIG. 12A shows an example of a data structure 1200 that may be used to perform the operations shown in FIGS. 9 and 10. As shown, data structure 1200 includes a travel pattern record 1210 and a stop record 1250. The travel pattern record 1210 includes a travel pattern identifier field 1211, a name field, an origin identifier field 1212, a destination identifier field 1213, a route links field, an alternative route links field, a frequency field 1215, a source field, a time/day constraints field 1216, a source field, and a last occurrence field 1217. The travel pattern identifier field 1211 includes data that uniquely defines each travel pattern even if the other fields have common data. For example, the travel pattern identifier 1211 may include a sequence key where each new record includes a key that is incremented by one from the previous record. The origin identifier field 1212 stores data related to an origin of the travel pattern. For example, the origin identifier field 1212 may include a starting street address, longitude and latitude coordinates for the origin of the travel pattern, or a position number that represents the origin on a route map. The destination identifier field 1213 stores data related to a destination of the travel pattern. Similar to the origin identifier field 1212, the destination identifier field 1213 may include an ending street address, longitude and latitude coordinates for the destination of the travel pattern, or a position number that represents the destination on a route map. The frequency field 1215 stores data related to a frequency with which the particular travel pattern will be or has been traveled. The frequency may be represented as an abstract assessment of the frequency, such as high or low, or as a period or number of occurrences per unit of time. The time/day constraints field 1216 stores data relating to a likely time of day that the particular travel pattern may be taken and/or a likely day that the travel pattern may be taken. For example, time/day constraints for a route to a church may be specified as being between 7 AM to 10 AM on Sundays. The last occurrence field 1217 includes information about a date a vehicle (or user) last followed the travel pattern associated with travel pattern identifier 1211. The last occurrence field 1217 may be used in analyzing matched travel patterns because some users may be more likely to travel to a destination recently visited (as opposed to a destination that they have visited less recently). For example, a National Football League season ticket holder may be likely to travel to the stadium for another game in the fall, when the ticket holder likely visited the stadium in the past week or so. In contrast, a visit to the stadium is less likely in the summer when the ticket holder has not visited the stadium for several months.

The stop record 1250 includes a stop identifier field 1218, a name field, a node identifier field 1219, a category of stop field 1220, a travel pattern identifier(s) field, a condition field 1221, a time/day constraints field 1222, and a last occurrence field 1223. The stop identifier field 1218 includes data that uniquely defines each stop even if the other fields have common data. The node identifier field 1219 stores data relating to a node associated with a stop. For example, the node identifier 1219 may include information relating to a node nearby the stop identified by stop identifier 1218. The node identifier 1219 may be used to assist in calculating a route to the stop or as a location where the stop may be suggested to the user. The category of stop field 1220 includes information regarding the type of stop. For example, a category of stop may include "gas" for a gas station, "cash" for an ATM or bank, or "restaurant" for a food service establishment. The condition field 1221 stores information that signifies that the stop should be suggested when a particular event occurs. For example, the condition field 1221 may denote that a stop may be suggested at a particular day and time, such as Thursday in the evening. The condition field 1221 may also include information that the stop should be suggested when a property of the vehicle occurs, such as when the level of the gas tank becomes low. When the condition is met, the stop is suggested to the user. The time/day constraints field 1222 stores data relating to the likely time of day that the stop would be made and the likely day that the stop would be made. For example, if a user goes out to breakfast only on Saturday mornings, the time/day constraints field may limit suggestions for a breakfast restaurant when the time is in the morning and the day is Saturday. The last occurrence field 1223 includes information about a date that a vehicle last visited a stop.

The data structures 1200 are examples of possible data structures that may be used in a system configured to perform the operations shown in FIGS. 9 and 10, such as the in-vehicle system shown in FIG. 11. Other data structures may feature different parameters, structures, values, and records.

Figure 12B:
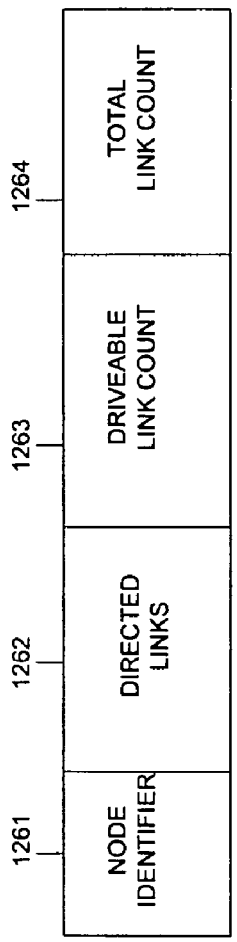
Figure 12C:
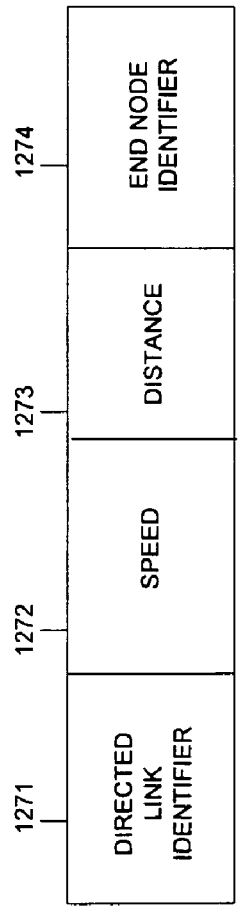

FIGS. 12B & 12C are examples of data structures for node information and directed link information, respectively. Node information and directed link information are used for determining a route from an origin location to a destination location. The determination is made by processing directed links (e.g., one-way edges) in a graph that includes one or more links and two or more nodes. In general, to determine a route to a destination, a routing system processes a particular directed link from a set of directed links by identifying one or more directed links that are adjacent to the end node of the particular directed link. For each directed link identified, the routing system determines a cost associated with the directed link and adds the directed link and its associated cost to the set of directed links. The routing system continues by selecting a directed link from the set and identifying one or more directed links that are adjacent (e.g., expanding the search set) until the destination has been reached or found. The destination has been reached, for example, when one or more identified directed links that include the destination as an end node. The route to a destination is determined based on the collection of identified directed links (e.g., a route) that has the lowest cost. The routing system may include, for example, an in-vehicle navigation system as shown in FIG. 11.

FIG. 12B is an example of a data structure 1260 for node information. Node information may be used by one or more steps in the determination of a route to a destination. The data structure 1260 represents an example of how node information may be organized. In general, the node information in data structure 1260 is used in a process to determine a route to a destination. In some cases, the node information in data structure 1260 or portions of the node information in data structure 1260 may be created and stored using data structure 1260 during a process to determine a route to a destination. This may be referred to as the dynamic generation of node information.

The node information data structure 1260 includes a node identifier 1261, directed links 1262, a driveable link count 1263, and a total link count 1264. The node identifier 1261 uniquely identifies the particular node. Directed links 1262 identify the directed links that are adjacent to the node. For example, directed links 1262 may include a list of the directed link identifiers that are adjacent to the node. Directed links 1262 also may point to a position in a directed link index that is associated with the first directed link that is adjacent to the node. When the directed link index is organized so that the directed links adjacent to a particular node are linked, additional directed links that are adjacent to the node also may be identified. The driveable link count 1263 indicates the number of drivable directed links that are adjacent to the node. The total link count 1264 indicates the total number of links (e.g., driveable directed links and non-driveable directed links) that are adjacent to the node. In some implementations, the node identifier 1261 may be determined based on the position information of the node relative to one or more other nodes and/or one or more directed links.

FIG. 12C is an example of a data structure 1270 for directed link information. Directed link information may be used by one or more steps in the determination of a route to a destination. The data structure 1270 represents an example of how directed link information may be organized. In general, the directed link information in data structure 1270 is used in a process to determine a route to a destination. In some cases, the directed link information in data structure 1270 or portions of the directed link information in data structure 1270 may be created and stored using data structure 1270 during a process to determine a route to a destination. This may be referred to as the dynamic generation of directed link information.

The directed link data structure 1270 includes a directed link identifier 1271, a speed 1272, a distance 1273, and an end node identifier 1274. The directed link identifier 1271 uniquely identifies a particular directed link. The speed 1272 identifies an average speed for traversing the directed link. The distance 1273 indicates the distance to traverse the directed link. Collectively, the speed 1271 and the distance 1273 may be used to determine a cost to traverse the directed link. Some implementations may include a cost in lieu of or in addition to the speed 1272 and the distance 1273. The end node identifier 1274 uniquely identifies the particular node that is the end node of the directed link.

Some implementations may include a start node identifier. The ability to traverse between node information, such as the node information that uses node information data structure 1260 in FIG. 12B, and directed link information, such as directed link information that uses directed link information data structure 1270, may be useful in determining a route to a destination. For example, a routing process may identify the directed links that are adjacent to a particular node, then identify the end node of a particular directed link, then identify the directed links from that end node, and so on.

Some implementations may use other software engineering techniques to identify a particular node and/or a particular directed link. For example, a geographic tiling method may be used in which a geographic region, such as the United States, is overlaid with a grid of blocks or tiles. Each tile may correspond to a portion of the geographic region and may be interlinked. For each tile, the latitude and longitude coordinates may be associated with a particular reference point of a tile (e.g., the lower left corner of a tile). A particular location (e.g., a particular node or a particular directed link) may be identified based on an association with a particular tile and the location of the particular location within the tile.

FIG. 13 illustrates exemplary records using the format described with respect to FIG. 12A. Specifically, travel pattern data 1310 illustrates exemplary travel pattern records (e.g., 1210 in FIG. 12A), and stop data 1350 illustrates exemplary stop records (e.g., 1250 in FIG. 12A).

Referring to travel pattern data 1310, a travel pattern record may include "TP-1004" as a travel pattern identifier, "To School" as a travel pattern name, "Home" as an origin, "Westbriar Elementary School" as a destination, "RL-21232" as a route links (set), no data for an alternative route links (set), "High: Each Weekday" as a frequency, "Weekday Morning" as a time/day constraints, "Vehicle: Van" as a source, and "Mar. 5, 2005" as a last occurrence. Another travel pattern record may include "TP-1005" as a travel pattern identifier, "To Work" as a travel pattern name, "Home" as an origin, "XYZ Company Springfield, Mass." as a destination, "RL-54433" as a route links (set), "RL-34504" as an alternative route links (set), "High: Each Weekday" as a frequency, "Weekday Morning" as a time/day constraints, "Vehicle: Sedan" as a source, and "Mar. 5, 2005" as a last occurrence. A travel pattern record also may include "TP-1006" as a travel pattern identifier, "From Work" as a travel pattern name, "XYZ Company Springfield, Mass." as an origin, "Home" as a destination, "RL-483839" as a route links (set), "RL-493933" as an alternative route links (set), "High: Each Weekday" as a frequency, "Weekday Evening" as a time/day constraints, "Vehicle: Sedan" as a source, and "Mar. 5, 2005" as a last occurrence. Another travel pattern record may include "TP-1007" as a travel pattern identifier, "ABC Arena from Work" as a travel pattern name, "Work" as an origin, "ABC Arena" as a destination, "RL-03392" as a route links (set), "RL-49394" as an alternative route links (set), "Infrequent" as a frequency, "Evening" as a time/day constraints, "User: Kurt" as a source, and "Jan. 5, 2005" as a last occurrence. Further, a travel pattern record may include "TP-1008" as a travel pattern identifier, "ABC Arena from Home" as a travel pattern name, "Home" as an origin, "ABC Arena" as a destination, "RL-0454" as a route links (set), "RL-78494" as an alternative route links (set), "Infrequent" as a frequency, "Evening" as a time/day constraints, "User: Kurt" as a source, and "Jun. 5, 2004" as a last occurrence. Another travel pattern record may include "TP-1009" as a travel pattern identifier, "Aunt Sally's House" as a travel pattern name, "Home" as an origin, "1234 Main St. South Haven, S.C." as a destination, "RL-94939" as a route links (set), "RL-04949" as an alternative route links (set), "Low: Twice Per Year" as a frequency, "Morning Departure" as a time/day constraints, "User: Jane" as a source, and "Nov. 23, 2004" as a last occurrence.

Travel pattern data 1310 illustrates the breadth of the data that may be stored in a travel pattern record (e.g., 1210 of FIG. 12A). For example, a travel pattern name may include "To Work" or "From Work," a frequency may include "High: Each Weekday," "Infrequent," or "Low: Twice Per Year," a time/day constraint may include "Weekday Morning," "Weekday Evening," "Evening," or "Morning Departure," and a source may include a "Vehicle" or a "User."

Referring to stop data 1350, a stop record may include "ST-4569" as a stop identifier, "ABC Grocery Store" as a stop name, "N949443" as a node identifier, "Grocery Store" as a category of stop, "TP-1006" as a travel pattern identifier, "Reminder: Thursday Evening" as a condition, no entry for Time/Day Constraints, and "Mar. 1, 2005" as a last occurrence. Another stop record may include "ST-4969" as a stop identifier, "Organic Grocery" as a stop name, "N95949" as a node identifier, "Grocery Store" as a category of stop, "TP-1006" as a travel pattern identifier, "Infrequent" as a condition, no entry for Time/Day Constraints, and "Feb. 28, 2005" as a last occurrence. A stop record also may include "ST-4978" as a stop identifier, "ZYX Gas" as a stop name, "N984849" as a node identifier, "Gas" as a category of stop, "TP-1006" as a travel pattern identifier, "Detected Low Fuel" as a condition, no entry for Time/Day Constraints, and no entry for last occurrence. Another stop record may include "ST-5678" as a stop identifier, "BCD Travel Plaza" as a stop name, "N34533" as a node identifier, "Turnpike Service Area" as a category of stop, "TP-1009" as a travel pattern identifier, "Proximity To N34533" as a condition, no entry for Time/Day Constraints, and "Nov. 23, 2004" as a last occurrence.

Stop data 1350 illustrates the breadth of the data that may be stored in a stop record (e.g., 1250 of FIG. 12A). For example, a category of stop may include a "Grocery Store," "Gas," or "Turnpike Service Area," and a condition may include "Reminder: Thursday Evening," "Infrequent," "Detected Low Fuel," or "Proximity To N34533."

Figure 14:
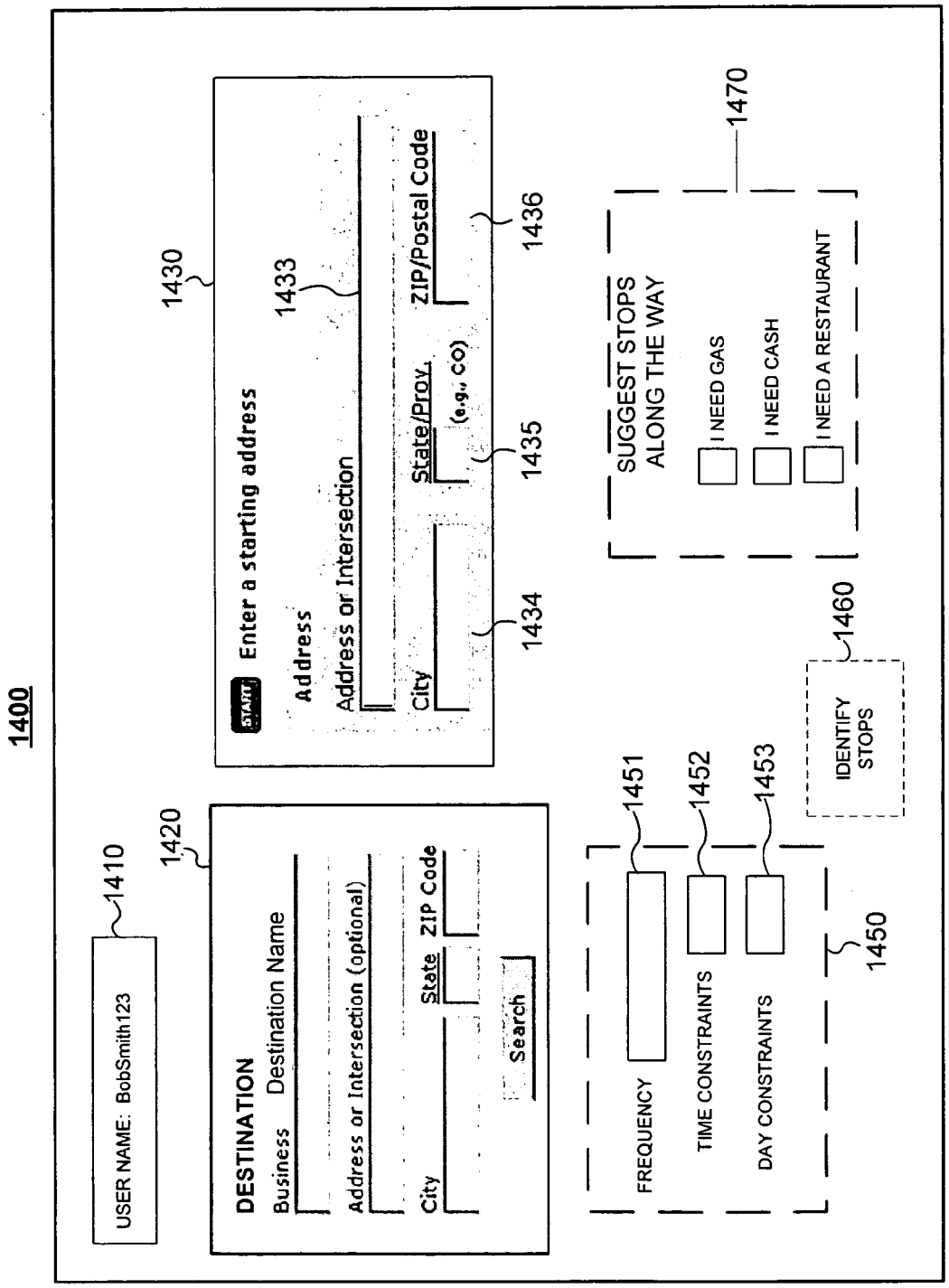
FIG. 14 shows an exemplary user interface for user configuration of travel patterns.

FIG. 14 shows an exemplary user interface ("UI") 1400 enabling user configuration of travel patterns. UI 1400 may be presented to a user wishing to store travel patterns that can be accessed to predict a route to a destination based on a route partially completed by a ground-based vehicle. The UI 1400 may be displayed, for example, on an in-vehicle system, a mobile device, such as a cellular phone or PDA, or any other device, such as a personal computer, capable of storing travel patterns that are accessed to predict a route to a destination.

The UI 1400 includes a user identification portion 1410, a destination selection portion 1420, an origin portion 1430, an additional prediction information portion 1450, an identify stops button 1460, and a suggest stops portion 1470. User identification portion 1410 and destination selection portion 1420 were described previously with respect to user identification portion 510 and destination selection portion 520 of FIG. 5. Similarly, origin portion 1430 was described previously with respect to origin portion 630 of FIG. 6. After entering user identification, destination, and origin information, a user may activate a store button (not shown) to store the information in a travel pattern record (e.g., 1210 of FIG. 12A). The information entered in the user identification portion 1410, the destination selection portion 1420, and the origin portion 1430 may be stored in a travel pattern record (e.g., as the source, the destination identifier 1213, and the origin identifier 1212 of FIG. 12A, respectively). The user-configured travel pattern record may then be used to generate a predicted destination based on a route partially completed by a ground-based vehicle.

UI 1400 also may include an additional prediction information portion 1450. The additional prediction information portion 1450 enables users to enter additional information about the particular route to increase the accuracy of a prediction. The additional prediction information portion 1450 may include a frequency field 1451, a time constraints field 1452, and a day constraints field 1453. The frequency field 1451 enables a user to enter a probability or likelihood that the route may be traveled. For example, a user may label a route to work as high or frequent, but a route to the dentist's office that the user typically visits only twice a year as low or infrequent. The frequency may be entered in terms of number of occurrences per unit time. The time constraints field 1452 allows a user to enter the likely time a particular route may be traveled. For example, a user may label a route to work as traveled between 6 AM to 9 AM or in the morning, and route home from work as traveled between 5 PM to 9 PM or in the afternoon. The day constraints field 1453 allows a user to specify the likely days the route may be traveled. For example, a user may label a route to work as traveled on Monday through Friday and a route to church as traveled on Sunday. Upon activation of the store button (not shown), the information entered in frequency field 1451, time constraints field 1452, and/or day constraints field 1453 may be stored in a travel pattern record (e.g., as the frequency 1215 and time/day constraints 1216 of FIG. 12A, respectively).

The UI 1400 also may include a suggest stops portion 1470. The suggest stops portion 1470 allows a user to specify categories of stops for which alerts should be generated when traveling along a particular route. The suggest stops portion 1470 may include, for example, the desire for suggestions on where a user can find gas, money, or a restaurant along the particular route. For example, when a route covers a long distance, a user may desire suggestions of where the user can obtain gas or find a restaurant when the user will likely need to refuel a vehicle or stop for a meal. Similarly, when the destination is a sporting event or amusement park, a user may desire suggestions of where the user can obtain cash along the route because the user will likely require cash at the destination. The suggest stops portion 1470 allows a user to indicate the information the user desires when traveling a particular route.

UI 1400 also may include an identify stops button 1460 that allows a user to identify preferred stops along a route. When a user selects the identify stops button 1460, a UI for entering information about a preferred stop (e.g., UI 1500 of FIG. 15) is displayed.

Figure 15:
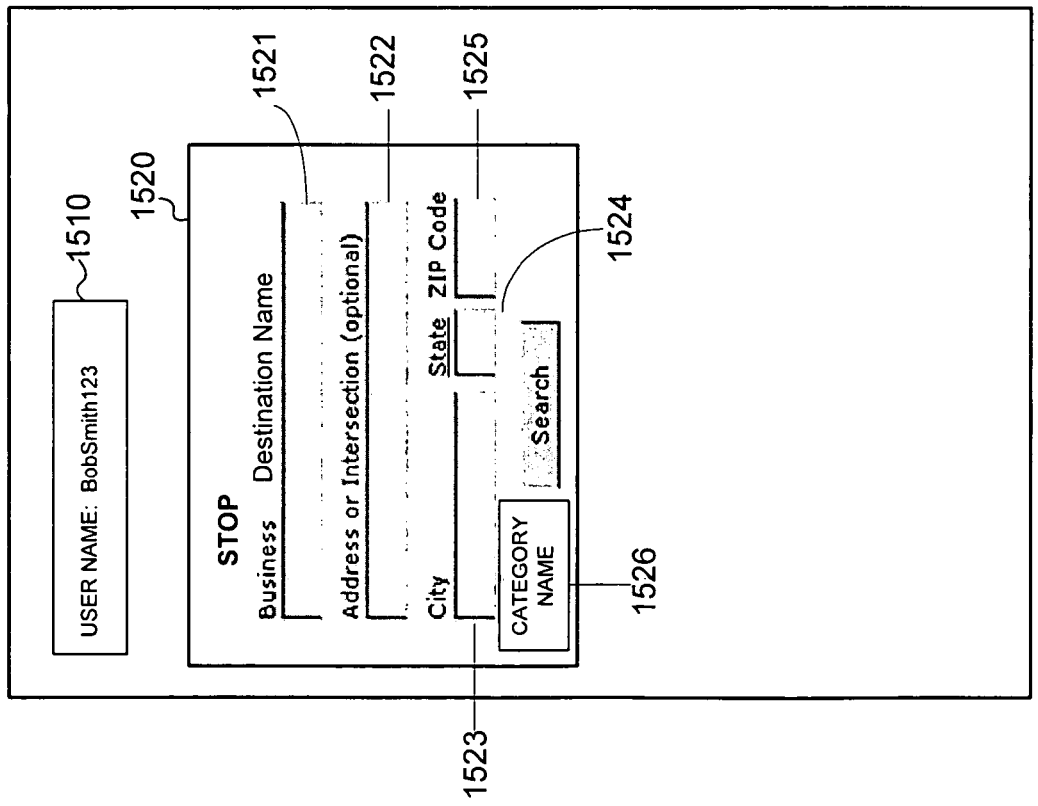
FIG. 15 shows an exemplary user interface for entering information about a preferred stop.

FIG. 15 shows an exemplary UI 1500 for entering information about a preferred stop. For example, a user may select the identify stops button 1460 shown in FIG. 14. UI 1500 includes a user identification portion 1510 and a stop selection portion 1520. The user identification portion 1510 was described previously with respect to user identification portion 510 of FIG. 5. The stop selection portion 1520 includes a destination name field 1521, an address or intersection field 1522, a city field 1523, a state field 1524, a zip code field 1525, and a category name field 1526. The category name field 1526 indicates the category or type of stop, such as gas, cash, or restaurant. UI 1500 also includes a store button (not shown) that may be used to store the entered information as a preferred stop associated with a particular route. For example, the information may be stored as a stop record 1250 shown in FIG. 12A. If a user only knows partial information about a desired stop, the user may search for the desired stop with partial information before storing.

Figure 16:
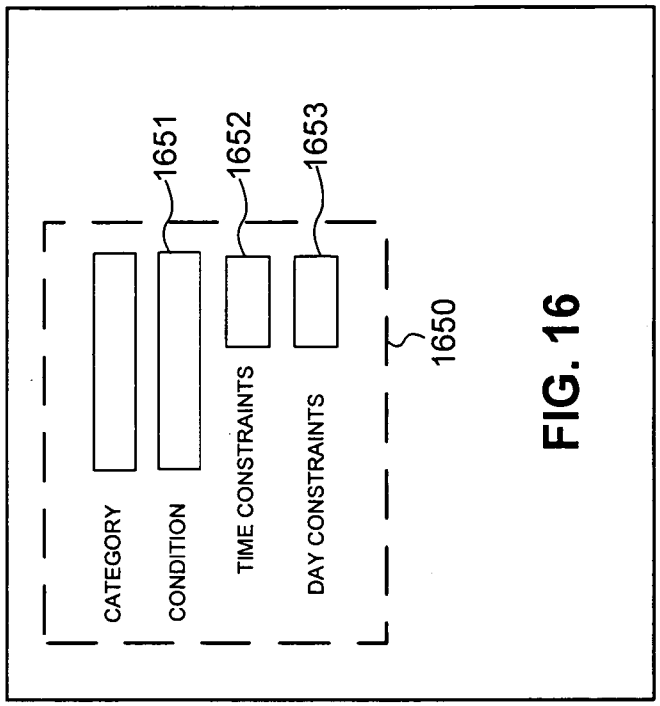
FIG. 16 shows an optional user interface for entering information about when a stop should be suggested.

FIG. 16 shows an exemplary UI 1600 for entering information about when a stop should be suggested. For example, UI 1600 may be displayed in UI 1400 in order to store information related to when a certain category of stops should be suggested or in UI 1500 to store information related to when a preferred stop should be suggested. UI 1600 includes a suggestion information portion 1650. The suggestion information portion 1650 may include a category field, a condition field 1651, a time constraints field 1652, and a day constraints field 1653. The condition field 1651 enables a user to specify that a certain category of stops or a specific preferred stop should be suggested when a condition occurs. For example, a user may request suggestions for a gas stop when the level of fuel in the gas tank becomes low. The time constraints field 1652 enables a user to request notification of a certain category of stop or a specific preferred stop only during a particular period of time. For example, a user may request suggestions for a restaurant only during times when the user is likely to eat a meal.

The day constraints field 1653 enables a user to request notification of a certain category of stops or a specific preferred stop only on a certain day or range of days. For example, a user may want suggestions for a bank only on Monday through Friday because the bank is not open on the weekend. When the user activates the store button (not shown), the information entered into the suggestion information portion 1650 may be stored (e.g., in a stop record 1250 shown in FIG. 12A).

Figure 17:
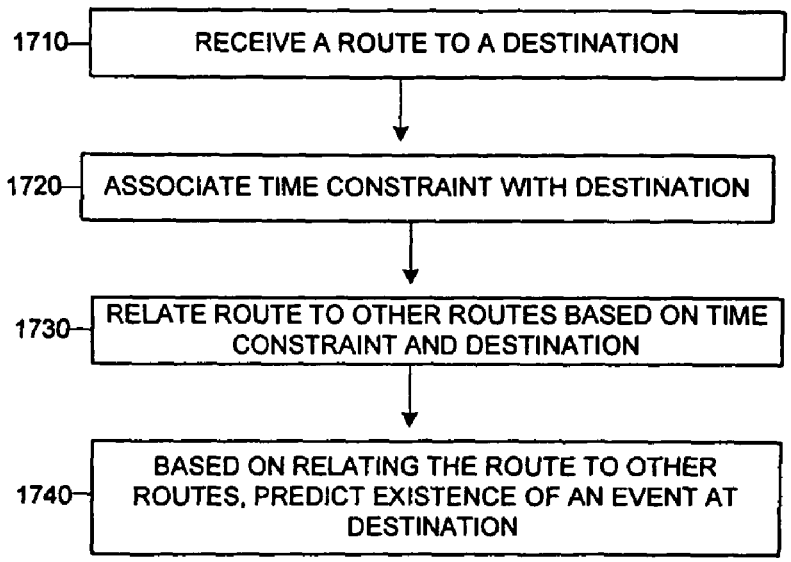
FIG. 17 shows an exemplary process for predicting an event by relating multiple routes to a destination.

FIG. 17 is a flow chart 1700 of an exemplary process by which an event may be predicted by relating multiple routes to a destination. The operations in flow chart 1700 are described generally as being performed on a processor. In one implementation the processor includes a communication system shown in FIG. 18.

The processor receives a route to a destination (1710). For example, the route to a destination may be directly entered through a UI on the system or received over a network. The destination received may be entered by a user or predicted based on a partially completed route.

Next, a time constraint is associated with the route (1720). The time constraint may include a time a user is making a request, a time a user plans to travel to the destination, and/or a time a user expects to arrive at the destination. For example, a time constraint for a destination predicted by a partially completed route may be the current time because the user is currently traveling to the destination. A time also may be the estimated arrival time predicted by an in-vehicle navigation system. In one implementation, the expected arrival time may represent a more accurate indication of an event since a traveler that lives near an event will likely start traveling at a much different time than a person that lives far away from an event when both travelers from near and afar plan to arrive at approximately the same time.

After associating a time constraint with the received route, the route is related to other routes based on the time constraint and destination (1730). Relating a route to other routes may include comparing the received route with routes received previously from other users. For example, a first user's route may be received for an expected arrival at a stadium at 7:00 PM on a Saturday night. The first user's route is related to routes previously received from other users to determine if other users are traveling to the stadium's vicinity at that time (or approximate time).

When relating a route to other routes to predict a destination of an event, a proximity of a route to the destination may be weighted and routes further from the destination may be given less weight. For example, a user traveling to a stadium may provide a strong indication that an event is occurring at the stadium. A user traveling to a restaurant near a stadium may provide a moderate indication that an event is occurring at the stadium because users often travel to a restaurant near a stadium before attending an event at the stadium. On the other hand, a user traveling to a grocery store far from a stadium may provide no indication that an event is occurring at the stadium because users rarely travel to a grocery store far from a stadium before attending an event at the stadium.

When relating a route to other routes to predict a time of an event, a proximity of time of travel to an expected time for an event may be weighted and routes being traveled further from the expected time for an event may be given less weight. For example, a user traveling to a stadium at 7:00 P.M. on Saturday may provide a strong indication that an event is occurring at the stadium Saturday night. A user traveling to a stadium at 1:00 P.M. on Saturday may provide a moderate indication that an event is occurring on Saturday night because users often travel to a stadium in advance of an event to participate in other activities, such as tailgating. On the other hand, a user traveling to a stadium on Tuesday at 3:00 P.M. may provide little indication that an event is occurring at the stadium on Saturday night because users rarely travel a stadium on Tuesday at 3:00 P.M. because the user is attending an event at the stadium on Saturday night.

Based on relating the route to other routes, the existence of an event at the destination is predicted (1740). 1740 may include determining a number of users traveling to a destination in the same time window, and, if the number reaches a certain threshold, predicting an event at the destination. For example, if many users are traveling to the destination within the same time constraint, then an event is likely be predicted at the destination. On the other hand, if a user is the first person traveling to a destination at that time, then an event will likely not be predicted at the destination or at least not until more users are traveling to the destination. As the number of routes received increases, the accuracy of event prediction increases.

Figure 18:
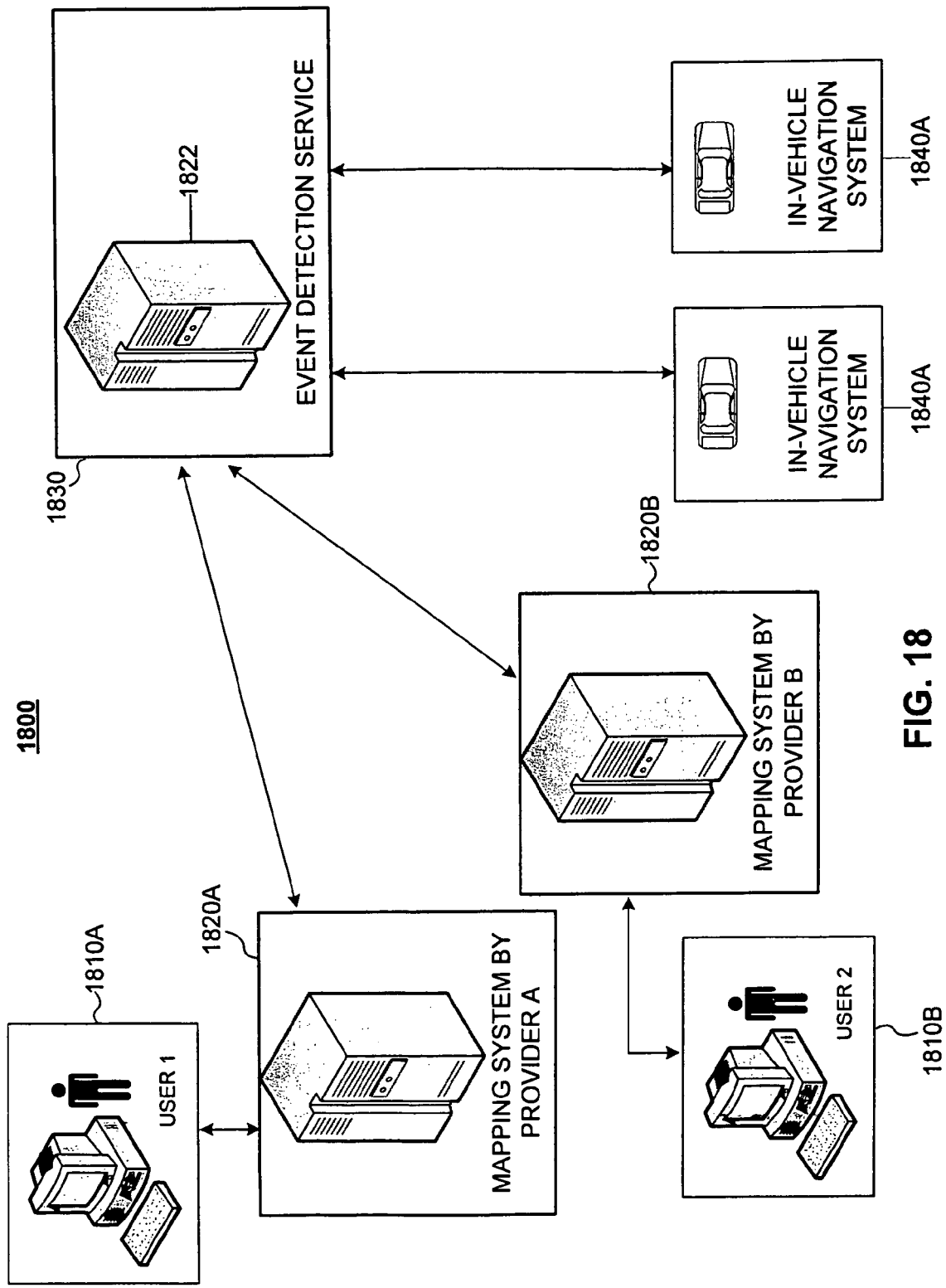
FIG. 18 illustrates an exemplary communication system where the event detection service is independent from mapping systems and in-vehicle navigation systems.

FIG. 18 illustrates an exemplary communication system 1800 where the event detection service 1830 is independent from mapping systems 1820A, 1820B and in-vehicle navigation systems 1840A, 1840B. The communication system 1800 includes users 1810A, 1810 B and mapping system providers 1820A, 1820B, described previously with respect to FIG. 7. The communication system 1800 also includes in-vehicle navigation systems 1840A and 1840B. The in-vehicle navigation systems 1840A and 1840B, for example, may input destinations from users and predict a user's destination based on a partially completed route.

The event detection service 1830 receives mapping query information from the mapping service providers 1820A, 1820B and destination information from in-vehicle navigation systems 1840A, 1840B. Based on the mapping query information and the destination information, the event detection service 1830 relates multiple user queries and multiple user destinations to predict a potential or emerging event. The event detection service 1830 may notify the mapping service providers 1820A, 1820B about an emerging event. Subsequently, mapping service providers may present users 1810A and 1810B with information about the emerging event. In addition, the event detection service 1830 may notify the users of the in-vehicle navigation systems 1840A, 1840B directly with information about an emerging event.

Although FIGS. 1-18 illustrate systems and operations for predicting an event based on mapping queries and destinations, predicting a route to a destination based on a partially completed route, and suggesting stops along a route, the operations may be applicable in other contexts. For example, a mapping system or in-vehicle navigation system may make suggestions to the user based on information pertaining to the route the user is taking. The mapping system or in-vehicle navigation system may alert the user that high tolls exist along the route and suggest that the user obtain cash prior to reaching the tolls. The system then may suggest stops where the user can obtain cash prior to the tolls and alert the user of the last stop to obtain cash before reaching the tolls. A mapping system or in-vehicle navigation system also may suggest possible services to the vehicle that the user may desire based on the route the vehicle may take to reach the destination. For example, if the route takes the user through roads that are in poor condition, the system may suggest that the user verify a spare tire is in good working order and suggest locations where a spare tire can be purchased. In another example, the system may suggest that the user have the engine of a vehicle serviced and/or brakes checked prior to traveling through a mountainous route.

In addition, a mapping system or navigation system may predict that a user may desire a certain product based on the destination or event the user is traveling to. More precisely, an in-vehicle navigation system may suggest a particular product or display an advertisement for a particular product to the user and suggest retailers along the route from which the user may purchase the product. For example, an in-vehicle navigation system may display an advertisement for sun tan lotion if the user enters or the system predicts a destination to a beach. If the user desires to purchase the sun tan lotion, the in-vehicle navigation system may suggest stops along the route where the user may purchase the lotion. The in-vehicle navigation system also may consider other factors in suggesting a product to a user. For example, if a user is traveling to a ski resort area in the winter, the system may display an advertisement of skis the user may wish to purchase and suggest stops where the user may purchase the skis. However, if the user is traveling to a ski resort area in the summer, the system likely would not suggest skis to the user, instead suggesting hiking boots.

A mapping system or in-vehicle navigation system also may provide the user information about the forecasted weather along the route for the time the user is traveling and make suggestions based on the weather. For example, if the forecast along a route calls for rain, the system may suggest checking to determine if the vehicle's wiper blades need to be changed or give the user suggestions on where an umbrella may be purchased.

Moreover, an in-vehicle navigation system may predict certain vehicle actions based on the upcoming route and either suggest the action to the user or perform the action. For example, when a vehicle is approaching a turn, the in-vehicle navigation system may predict the use of a turn signal and suggest that the user activate the turn signal or activate the turn signal automatically. In another example, the in-vehicle navigation system may detect that the upcoming route takes the user through a tunnel. The in-vehicle navigation system may suggest that the user turn on the headlights prior to entering the tunnel or turn the headlights on automatically as the vehicle enters the tunnel.

A mapping system or in-vehicle navigation system also may suggest other forms of transportation to the user other than a ground-based vehicle. For example, if a user requests directions to a destination that is far away, the system may suggest airports nearby the origin location and the destination. The system may even suggest particular flights or display air fares of particular carriers. In another example, an in-vehicle navigation system may predict or learn that there is a large amount of traffic congestion along the route the user is traveling and other similar routes to the destination. The in-vehicle navigation system may suggest an alternative form of transportation, such as taking a nearby subway, that could reduce the travel time for the user. The in-vehicle navigation system may provide routing information to the other form of transportation and instructions on how to use the other form of transportation.

In one implementation, the navigation system may be configured to predict a destination or an event. For example, the navigation system may be configured to predict a destination based on a determination that a vehicle is traveling in particular direction on a particular road (e.g., a location and a direction). In another example, an event may be predicted in response to receiving a user location and an indication that other users proximate to the user are traveling to a destination and/or an event. In yet another example, an event and/or a destination may be determined based on a location and a determination that other users with similar profiles are traveling to a destination and/or an event.

A navigation system may be configured to identify a destination and/or an event in response to determining a degree of travel. For example, local destinations may be suggested in response to determining that a vehicle is traveling in a local environment while significant events may be avoided or disfavored (e.g., displayed after local destinations or events are rendered). Similarly, a navigation system in a vehicle whose driver is 'on vacation' (far away from a routine geographic operating range) may suggest more significant points of interest. In one implementation, a more significant point of interest includes likely destinations or events for users outside of their local environment, such as a national convention.

In one implementation, a local environment is based on a geographic reference, such as a state, a county or a zip code. In another implementation, a local environment is based on proximity (e.g., within 10 miles) to a home address (e.g., a location where a vehicle is located before a day's activities begin). In yet another implementation, a navigation system dynamically defines a local environment based on where a vehicle (or navigation system) travels and the frequency of travel. For example, a user may transit three jurisdictions during daily commute between home and the office. A navigation system may define the local environment to include a geographic region proximate to a route traveled during the daily commute.

In some environments, such as a convention center hosting multiple events, a user may be prompted for additional information to distinguish between multiple events occurring within a proximity threshold. For example, a navigation system may present a message indicating "You appear to be headed to the convention center. There appear to be 3 similar destinations within a two block radius and 5 events at the convention center. Is one of the following destinations and/or events of particular interest to you?" The message then may display destinations and events, which a user may select to retrieve additional information responsive to their interests. For example, after a user selects one event, the user may receive a message indicating that complimentary valet parking is available at a particular entrance.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method for predicting a destination for a ground-based vehicle, the method comprising:
    accessing, using a processor, travel patterns via a delivery network, the accessed travel patterns being associated with a particular user;
    receiving, using the processor, a series of locations of the particular user in a ground-based vehicle;
    relating, using the processor, at least some of the received locations to at least one accessed travel pattern;
    predicting, using the processor, a destination of the particular user in the ground-based vehicle based on relating the received locations to the travel patterns; and
    generating a route based on the predicted destination.

2. The method of claim 1 further comprising displaying an indication of the predicted destination or a user confirmation for the indication of the predicted destination.

3. The method of claim 1 further comprising notifying a user of information related to the predicted destination.

4. The method of claim 3 wherein notifying the user includes notifying a user that an event is predicted at the destination.

5. The method of claim 4 further comprising interrogating a user for more information related to the event so as to distinguish between multiple events occurring within a proximity threshold.

6. The method of claim 3 wherein notifying the user includes notifying the user about a point of interest along the route to the destination.

7. The method of claim 6 wherein the point of interest includes an ATM, a gas station, a restaurant, or a shopping venue related to the destination.

8. The method of claim 1 further comprising notifying a user of information related to a route to the predicted destination.

9. The method of claim 1 further comprising determining a route to the predicted destination and providing driving directions to the destination.

10. The method of claim 1 wherein the travel patterns include historical route information.

11. The method of claim 1 wherein the travel pattern comprises real-time route information indicative of other vehicles in transit as the travel patterns are accessed.

12. The method of claim 11 wherein the prior routes traveled are routes traveled by the ground-based vehicle.

13. The method of claim 1 wherein the travel patterns comprise prior routes traveled by a portable device currently associated with the ground-based vehicle.

14. The method of claim 1 wherein the travel patterns comprise routes traveled during a particular time of day.

15. The method of claim 1 wherein the travel patterns comprise routes traveled during a particular day of week.

16. The method of claim 1 wherein the travel patterns comprise a frequency of traveling a route.

17. The method of claim 1 wherein the travel patterns comprise a travel pattern of a person associated with the vehicle.

18. The method of claim 1 further comprising accessing information about a network of roads.

19. The method of claim 18 wherein the information about the network of roads comprises a routing graph representing a network of roads and including two or more nodes and one or more links, each link representing a road and each node representing an intersection that includes at least one road.

20. The method of claim 1 wherein a location in the series is determined from a global positioning system associated with the ground-based vehicle.

21. The method of claim 20 wherein a location in the series is received from a global positioning system that is external to the vehicle.

22. The method of claim 21 wherein a location in the series is received from a global positioning receiver that is internal to the vehicle.

23. The method of claim 1 wherein a location in the series is determined from a mobile device associated with the ground-based vehicle.

24. The method of claim 23 wherein the mobile device comprises a mobile telephone.

25. The method of claim 1 wherein a location in the series is determined by triangulating a position of the ground-based vehicle.

26. The method of claim 1 wherein receiving the series of locations includes receiving a single location and a direction of travel.

27. The method of claim 1 wherein receiving a series of locations includes receiving a single location and time of day.

28. The method of claim 1 further comprising:
detecting an interest by others in a venue; and
using the interest by others in the venue to predict the destination.

29. The method of claim 28 wherein detecting the interest by others in the venue includes receiving a route request by the others.

30. The method of claim 28 wherein detecting the interest by others in the venue includes receiving location and direction information for users travelling via a different route.

31. The method of claim 28 wherein detecting the interest by others in the venue includes receiving an indication that the others are travelling via a same route.

32. The method of claim 28 wherein detecting the interest by others in the venue includes determining users with a similar profile have referenced event information published on a communications network.

33. The method of claim 32 further determining that the users with the similar profile are travelling to the venue.

34. A method of predicting existence of an event, the method comprising:
receiving, using a processor, a request to generate a route to a destination via a delivery network for a particular user;
accessing, using the processor, a time constraint associated with the request;
relating, using the processor, the route for the particular user to other routes based on the time constraint and the destination;
determining, based on relating the route to other routes, that multiple users are traveling to the destination; and
based on determining that the multiple users are traveling to the destination, predicting the existence of an event at the destination using the processor.

35. The method of claim 34 wherein the route comprises a route derived from an in-vehicle navigation system.

36. The method of claim 34 wherein the destination comprises a location predicted based on a partially completed route traveled by a ground-based vehicle.

37. The method of claim 34 wherein the route comprises a route determined in response to a mapping query.

38. The method of claim 34 further comprising notifying a user of the event.

39. The method of claim 38 wherein notifying the user comprises interrogating the user for more information related to the event so as to distinguish between multiple events occurring within a proximity threshold.

40. The method of claim 38 wherein notifying the user comprises providing information related to anticipated traffic conditions associated with the event.

41. The method of claim 40 wherein providing information related to the anticipated traffic conditions associated with the event comprises providing a suggested alternative route to the location of the event.

42. The method of claim 38 wherein notifying the user comprises providing information related to anticipated parking conditions for the event.

43. The method of claim 38 wherein notifying the user comprises providing event information that is received from a source other than a mapping system used to detect the event.

44. The method of claim 34 wherein accessing a time constraint associated with the request includes accessing a time constraint associated with submission of the event.

45. The method of claim 34 wherein accessing a time constraint associated with the request includes accessing a time constraint associated with a travel time specified by the request.

46. A computer-implemented method for predicting a destination for a ground-based vehicle, the method comprising:
accessing, using a processor, travel patterns via a delivery network, the accessed travel patterns being associated with a particular user;
receiving, using the processor, a series of locations of the particular user in a ground-based vehicle;
determining, using the processor, a degree of travel for the ground-based vehicle, the degree of travel indicative of an extent to which a destination is identified as being local to a user;
relating, using the processor, at least some of the received locations to at least one accessed travel pattern;
predicting, using the processor, the destination of the particular user based on relating the received locations to the travel patterns; and
identifying, using the processor, a route to the destination that is supported by the degree of travel.

47. The method of claim 46 wherein determining the degree of travel includes determining that the user is travelling beyond a local environment.

48. The method of claim 47 wherein identifying the destination includes determining that the destination represents a point of interest for a user travelling beyond the local environment.

49. The method of claim 47 wherein identifying the destination includes determining that other users are travelling beyond their local environment are travelling to the destination.

50. The method of claim 46 determining the degree of travel includes determining that the user is travelling in a local environment.

51. The method of claim 50 wherein identifying the destination includes determining that the destination represents a point of interest for a user travelling in the local environment.

52. The method of claim 50 wherein determining the degree of travel includes determining that the user is travelling beyond a local environment.

53. A computer-implemented method for predicting an event for a ground-based vehicle, the method comprising:
accessing, using a processor, travel patterns via a delivery network, the accessed travel patterns being associated with a particular user;
receiving, using the processor, a series of locations of the particular user in a ground-based vehicle;
determining, using the processor, a degree of travel for the ground-based vehicle, the degree of travel indicative of an extent to which a destination is identified as being local to a user;
relating, using the processor, at least some of the received locations to at least one accessed travel pattern;
predicting results based on relating the received locations to the travel patterns;
generating a route based on the predicted result; and identifying at least one event on the route from one of the results that is supported by the degree of travel.

54. The method of claim 52 wherein identifying the event includes determining that one of the results represents a point of interest for a user travelling beyond the local environment.

55. The method of claim 52 wherein identifying the event includes determining that other users are travelling beyond their local environment are travelling to the destination.

56. The method of claim 52 determining the degree of travel includes determining that the user is travelling in a local environment.

57. The method of claim 56 wherein identifying the event includes determining that one of the results represents a point of interest for a user travelling in the local environment.

* * * * *